(12) United States Patent
Mansouri et al.

(10) Patent No.: US 12,583,180 B2
(45) Date of Patent: *Mar. 24, 2026

(54) RESERVOIR ASSEMBLY FOR ENHANCING A SURFACE FINISH OF A 3D-PRINTED OBJECT

(71) Applicant: SprintRay Inc., Los Angeles, CA (US)

(72) Inventors: Amir Mansouri, Los Angeles, CA (US); Huijian Tian, Los Angeles, CA (US); Hossein Bassir, Los Angeles, CA (US); Jing Zhang, Los Angeles, CA (US); Shukun Ye, Los Angeles, CA (US)

(73) Assignee: SprintRay, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,156

(22) Filed: Apr. 22, 2024

(65) Prior Publication Data

US 2024/0269928 A1      Aug. 15, 2024

Related U.S. Application Data

(63) Continuation of application No. 18/211,525, filed on Jun. 19, 2023, which is a continuation of application
(Continued)

(51) Int. Cl.
*B29C 64/255* (2017.01)
*B29C 64/245* (2017.01)
(Continued)

(52) U.S. Cl.
CPC .......... *B29C 64/255* (2017.08); *B29C 64/245* (2017.08); *B29C 64/264* (2017.08); *B29C 64/129* (2017.08); *B33Y 30/00* (2014.12)

(58) Field of Classification Search
CPC ... B29C 64/124; B29C 64/129; B29C 64/135; B29C 64/245; B29C 64/255; B29C 64/264; B33Y 10/00; B33Y 30/00
See application file for complete search history.

(56) References Cited

U.S. PATENT DOCUMENTS 4,575,330 A      3/1986  Hull
4,961,154 A      10/1990 Pomerantz et al.
(Continued)

FOREIGN PATENT DOCUMENTS

DE      4125534 A1      2/1993
EP      1439051 B1      7/2004
(Continued)

*Primary Examiner* — JaMel M Nelson
(74) *Attorney, Agent, or Firm* — Jafari Law Group, Inc.

(57) ABSTRACT

The present invention concerns a system and reservoir assembly for three-dimensional (3D) printing. The reservoir assembly includes a top frame that may be filled with liquid material, and a tensioned film being held underneath the top frame. The tensioned film may be air permeable and flexible, wherein surfaces of the tensioned film may be micro textured. A bottom frame is coupled to the top frame and secures a transparent or semi-transparent rigid substrate. In exemplary embodiments, one or more filters may be positioned below the tensioned film. The one or more filters may employ a texture that is adapted to control blurring of a projected image during a printing process in order to enhance a surface finish of a 3D-printed object.

10 Claims, 23 Drawing Sheets

Related U.S. Application Data

No. 17/151,540, filed on Jan. 18, 2021, now Pat. No. 11,679,555, which is a continuation-in-part of application No. 16/944,878, filed on Jul. 31, 2020, now Pat. No. 11,548,224, which is a continuation of application No. 16/556,118, filed on Aug. 29, 2019, now Pat. No. 10,766,194.

(60) Provisional application No. 62/808,295, filed on Feb. 21, 2019.

(51) Int. Cl.
| | |
|---|---|
| B29C 64/264 | (2017.01) |
| B29C 64/129 | (2017.01) |
| B33Y 30/00 | (2015.01) |

(56) References Cited

U.S. PATENT DOCUMENTS

| | | | |
|---|---|---|---|
| 5,122,441 | A | 6/1992 | Lawton et al. |
| 5,143,817 | A | 9/1992 | Lawton et al. |
| 5,171,490 | A | 12/1992 | Fudim |
| 5,175,077 | A | 12/1992 | Grossa |
| 5,182,715 | A | 1/1993 | Vorgitch et al. |
| 5,192,559 | A | 3/1993 | Hull et al. |
| 5,198,159 | A | 3/1993 | Nakamura et al. |
| 5,391,072 | A | 2/1995 | Lawton et al. |
| 5,474,719 | A | 12/1995 | Fan et al. |
| 5,545,367 | A | 8/1996 | Bae et al. |
| 5,897,825 | A | 4/1999 | Fruth et al. |
| 6,027,682 | A | 2/2000 | Almquist et al. |
| 6,391,245 | B1 | 5/2002 | Smith |
| 6,500,378 | B1 | 12/2002 | Smith |
| 6,838,035 | B1 | 1/2005 | Ederer et al. |
| 6,942,830 | B2 | 9/2005 | Mulhaupt et al. |
| 7,052,263 | B2 | 5/2006 | John |
| 7,195,472 | B2 | 3/2007 | John |
| 7,438,846 | B2 | 10/2008 | John |
| 7,573,561 | B2 | 8/2009 | Fries |
| 7,636,610 | B2 | 12/2009 | Schillen et al. |
| 7,783,371 | B2 | 8/2010 | John et al. |
| 7,790,093 | B2 | 9/2010 | Shkolnik et al. |
| 7,831,328 | B2 | 11/2010 | Schillen et al. |
| 7,845,930 | B2 | 12/2010 | Shkolnik et al. |
| 7,892,474 | B2 | 2/2011 | Shkolnik et al. |
| 7,894,921 | B2 | 2/2011 | John et al. |
| 7,962,238 | B2 | 6/2011 | Shkolnik et al. |
| 8,003,039 | B2 | 8/2011 | Sperry et al. |
| 8,003,040 | B2 | 8/2011 | El-Siblani |
| 8,110,135 | B2 | 2/2012 | El-Siblani |
| 8,126,580 | B2 | 2/2012 | El-Siblani et al. |
| 8,326,024 | B2 | 12/2012 | Shkolnik et al. |
| RE43,955 | E | 2/2013 | Shkolnik et al. |
| 8,372,330 | B2 | 2/2013 | El-Siblani et al. |
| 8,394,313 | B2 | 3/2013 | El-Siblani et al. |
| 8,658,076 | B2 | 2/2014 | El-Siblani |
| 8,666,142 | B2 | 3/2014 | Shkolnik et al. |
| 8,801,418 | B2 | 8/2014 | El-Siblani et al. |
| 8,815,143 | B2 | 8/2014 | John et al. |
| 8,845,316 | B2 | 9/2014 | Schillen et al. |
| 8,862,260 | B2 | 10/2014 | Shkolnik et al. |
| 9,034,237 | B2 | 5/2015 | Sperry et al. |
| 9,067,361 | B2 | 6/2015 | Ei-Siblani |
| 9,073,260 | B2 | 7/2015 | El-Siblani et al. |
| 9,073,261 | B2 | 7/2015 | El-Siblani et al. |
| 9,073,262 | B2 | 7/2015 | El-Siblani et al. |
| 9,075,409 | B2 | 7/2015 | El-Siblani et al. |
| 9,079,355 | B2 | 7/2015 | El-Siblani et al. |
| 9,486,944 | B2 | 11/2016 | El-Siblani et al. |
| 9,486,964 | B2 | 11/2016 | Joyce |
| 9,498,920 | B2 | 11/2016 | DeSimone et al. |
| 9,527,244 | B2 | 12/2016 | El-Siblani |
| 9,533,450 | B2 | 1/2017 | El-Siblani et al. |
| 9,539,072 | B2 | 1/2017 | Ei-Siblani |
| 9,561,623 | B2 | 2/2017 | El-Siblani et al. |
| 9,586,364 | B2 | 3/2017 | El-Siblani et al. |
| 9,636,873 | B2 | 5/2017 | Joyce |
| 9,688,023 | B2 | 6/2017 | Dean et al. |
| 9,902,112 | B2 | 2/2018 | El-Siblani et al. |
| 9,975,296 | B2 | 5/2018 | El-Siblani |
| 9,981,425 | B2 | 5/2018 | El-Siblani et al. |
| 9,987,804 | B2 | 6/2018 | El-Siblani et al. |
| 10,000,023 | B2 | 6/2018 | El-Siblani et al. |
| 10,005,237 | B2 | 6/2018 | El-Siblani et al. |
| 10,011,076 | B2 | 7/2018 | El-Siblani et al. |
| 10,112,345 | B2 | 10/2018 | El-Siblani et al. |
| 10,124,532 | B2 | 11/2018 | El-Siblani et al. |
| 10,144,205 | B2 | 12/2018 | El-Siblani |
| 10,201,963 | B2 | 2/2019 | Thomas et al. |
| 10,220,565 | B2 | 3/2019 | El-Siblani |
| 10,245,822 | B2 | 4/2019 | El-Siblani |
| 10,300,663 | B2 | 5/2019 | El-Siblani et al. |
| 10,335,997 | B2 | 7/2019 | El-Siblani et al. |
| 10,363,710 | B2 | 7/2019 | Rodriguez et al. |
| 10,414,090 | B2 | 9/2019 | El-Siblani et al. |
| 10,513,108 | B2 | 12/2019 | El-Siblani |
| 10,589,507 | B2 | 3/2020 | El-Siblani et al. |
| 10,632,732 | B2 | 4/2020 | El-Siblani et al. |
| 10,737,437 | B2 | 8/2020 | El-Siblani et al. |
| 10,737,479 | B2 | 8/2020 | El-Siblani et al. |
| 10,766,194 | B1 | 9/2020 | Mansouri et al. |
| 10,894,355 | B2 | 1/2021 | El-Siblani et al. |
| 2002/0153640 | A1 | 10/2002 | John |
| 2002/0155189 | A1 | 10/2002 | John |
| 2003/0021823 | A1 | 1/2003 | Landers et al. |
| 2003/0090034 | A1 | 5/2003 | Mulhaupt et al. |
| 2005/0248061 | A1 | 11/2005 | Shkolnik et al. |
| 2005/0248062 | A1 | 11/2005 | Shkolnik et al. |
| 2007/0063389 | A1 | 3/2007 | John |
| 2007/0260349 | A1 | 11/2007 | John et al. |
| 2008/0021586 | A1 | 1/2008 | Schillen et al. |
| 2008/0038396 | A1 | 2/2008 | John et al. |
| 2008/0113293 | A1 | 5/2008 | Shkolnik et al. |
| 2008/0174050 | A1 | 7/2008 | Kikuchi |
| 2009/0020901 | A1 | 1/2009 | Schillen et al. |
| 2009/0130449 | A1 | 5/2009 | El-Siblani |
| 2009/0132081 | A1 | 5/2009 | Schillen et al. |
| 2009/0146344 | A1 | 6/2009 | El-Siblani |
| 2009/0191489 | A1 | 7/2009 | Sandstrom |
| 2010/0125356 | A1 | 5/2010 | Shkolnik et al. |
| 2010/0249979 | A1 | 9/2010 | John et al. |
| 2010/0262272 | A1 | 10/2010 | Shkolnik et al. |
| 2011/0009992 | A1 | 1/2011 | Shkolnik et al. |
| 2011/0062633 | A1 | 3/2011 | Shkolnik et al. |
| 2011/0089610 | A1 | 4/2011 | El-Siblani et al. |
| 2011/0101570 | A1 | 5/2011 | John et al. |
| 2011/0196529 | A1 | 8/2011 | Shkolnik et al. |
| 2011/0260365 | A1 | 10/2011 | El-Siblani |
| 2012/0195994 | A1 | 8/2012 | El-Siblani et al. |
| 2013/0001834 | A1 | 1/2013 | El-Siblani et al. |
| 2013/0140741 | A1 | 6/2013 | El-Siblani et al. |
| 2013/0292862 | A1 | 11/2013 | Joyce |
| 2013/0295212 | A1 | 11/2013 | Chen et al. |
| 2013/0304233 | A1 | 11/2013 | Dean et al. |
| 2014/0052288 | A1 | 2/2014 | El-Siblani et al. |
| 2014/0170591 | A1 | 6/2014 | El-Siblani |
| 2014/0191442 | A1 | 7/2014 | Elsey |
| 2014/0239554 | A1 | 8/2014 | El-Siblani |
| 2014/0306380 | A1 | 10/2014 | El-Siblani et al. |
| 2014/0319735 | A1 | 10/2014 | El-Siblani et al. |
| 2014/0319736 | A1 | 10/2014 | El-Siblani et al. |
| 2014/0319737 | A1 | 10/2014 | El-Siblani et al. |
| 2014/0319738 | A1 | 10/2014 | El-Siblani et al. |
| 2014/0322374 | A1 | 10/2014 | El-Siblani et al. |
| 2015/0072293 | A1 | 3/2015 | DeSimone et al. |
| 2015/0102531 | A1 | 4/2015 | El-Siblani et al. |
| 2015/0145177 | A1 | 5/2015 | El-Siblani et al. |
| 2015/0224710 | A1 | 8/2015 | El-Siblani |
| 2015/0231828 | A1 | 8/2015 | El-Siblani et al. |
| 2015/0231831 | A1 | 8/2015 | El-Siblani |
| 2015/0246482 | A1 | 9/2015 | El-Siblani et al. |
| 2015/0246486 | A1 | 9/2015 | El-Siblani et al. |
| 2015/0246487 | A1 | 9/2015 | El-Siblani |
| 2016/0046080 | A1 | 2/2016 | Thomas et al. |

(56) References Cited

U.S. PATENT DOCUMENTS

| 2016/0136889 A1 | 5/2016 | Rolland et al. |
| 2016/0200052 A1* | 7/2016 | Moore .................. B29C 64/20 |
| | | 264/401 |
| 2016/0279895 A1 | 9/2016 | Marjanovic et al. |
| 2016/0297141 A1 | 10/2016 | El-Siblani et al. |
| 2016/0311160 A1 | 10/2016 | Nam et al. |
| 2016/0347006 A1 | 12/2016 | Kobayashi |
| 2016/0361872 A1 | 12/2016 | El-Siblani |
| 2016/0368210 A1 | 12/2016 | Chen et al. |
| 2017/0021562 A1 | 1/2017 | El-Siblani et al. |
| 2017/0028618 A1 | 2/2017 | Robeson et al. |
| 2017/0072635 A1 | 3/2017 | El-Siblani et al. |
| 2017/0080641 A1 | 3/2017 | El-Siblani |
| 2017/0100885 A1 | 4/2017 | DeSimone et al. |
| 2017/0100899 A1 | 4/2017 | El-Siblani et al. |
| 2017/0129167 A1 | 5/2017 | Castanon |
| 2017/0129168 A1 | 5/2017 | El-Siblani et al. |
| 2017/0165916 A1 | 6/2017 | El-Siblani |
| 2017/0210072 A1 | 7/2017 | Rodriguez et al. |
| 2017/0225393 A1 | 8/2017 | Shkolnik |
| 2017/0246804 A1 | 8/2017 | Ei-Siblani et al. |
| 2017/0326861 A1 | 11/2017 | El-Siblani et al. |
| 2017/0335271 A1 | 11/2017 | Maggiore |
| 2018/0104972 A1 | 4/2018 | Hart et al. |
| 2018/0126644 A1 | 5/2018 | Slaczka et al. |
| 2018/0126668 A1 | 5/2018 | El-Siblani et al. |
| 2018/0194080 A1 | 7/2018 | El-Siblani et al. |
| 2018/0272610 A1 | 9/2018 | El-Siblani et al. |
| 2018/0290373 A1 | 10/2018 | El-Siblani et al. |
| 2019/0030806 A1 | 1/2019 | Herman et al. |
| 2019/0047277 A1 | 2/2019 | El-Siblani |
| 2019/0099947 A1 | 4/2019 | El-Siblani et al. |
| 2019/0099948 A1 | 4/2019 | El-Siblani et al. |
| 2019/0176458 A1 | 6/2019 | El-Siblani |
| 2019/0270243 A1 | 9/2019 | El-Siblani et al. |
| 2019/0315062 A1 | 10/2019 | Achten et al. |
| 2020/0331255 A1 | 10/2020 | El-Siblani et al. |
| 2023/0236430 A1 | 7/2023 | Zhu et al. |

FOREIGN PATENT DOCUMENTS

| EP | 1439052 B1 | 7/2004 |
| EP | 3248781 A3 | 4/2018 |
| JP | H10199450 A | 7/1998 |
| WO | 1996000422 A1 | 1/1996 |
| WO | 2001000390 A1 | 1/2001 |
| WO | 2005110722 A1 | 11/2005 |

* cited by examiner

1003

1002

1001

310

320

330

340

350

370

360

300

380

390

1900

RESERVOIR ASSEMBLY FOR ENHANCING A SURFACE FINISH OF A 3D-PRINTED OBJECT

CROSS REFERENCE OF RELATED APPLICATION

This application is a continuation of U.S. Non-Provisional application Ser. No. 18/211,525, filed on Jun. 19, 2023, which is a continuation of U.S. Non-Provisional application Ser. No. 17/151,540, filed on Sep. 2, 2022, which is a continuation-in-part of U.S. Non-Provisional application Ser. No. 16/944,878, filed on Jul. 31, 2020, which is a continuation of U.S. Non-Provisional application Ser. No. 16/556,118, filed on Aug. 29, 2019, which claims the benefit of Provisional Application No. 62/808,295, filed Feb. 21, 2019, all of which are incorporated herein by reference in their entirety.

TECHNICAL FIELD OF THE INVENTION

The present invention generally relates to an apparatus, system and method for three-dimensional (3D) printing. More specifically, the present invention relates to a reservoir with a substrate assembly for reducing separation forces in three-dimensional printing.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever. Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Three-dimensional printing is a process to form a three-dimensional object from computer-aided design (CAD) data. Different from traditional processes such as casting and cutting, 3D printing utilizes adding instead of removing materials to create the solid object which could have a complex shape or geometry. This process is also known as additive manufacturing (AM), rapid prototyping or solid freeform fabrication. The machine to perform this process is called a 3D printer.

Basically, 3D printing is achieved by building a 3D object layer by layer from a particular material such as powdered metal, liquid of a prepolymer or any other appropriate materials. Each of these layers is a thin slice which represents the cross-section of the eventual object. It is generated by the process similar to the regular 2D printing in a single plane (x and y dimensions). All layers are laid over one another successively in z dimension. With the number of these layers accumulated, a 3D object is formed.

There are numbers of different technologies developed based on different materials and ways to form layers, for example, Fused Deposition Modeling (FDM), Stereolithography (SLA), 3D Inkjet Powder (3DP), Selective Laser Sintering (SLS).

Stereolithography is one of the most precise 3D printing techniques in the market. The principle of SLA is to create a 3D object by successively solidifying thin layers of liquid material which is curable by a light with a specific wavelength, starting from the bottom layer to the top layer. A conventional SLA system comprises a resin tank filled with a predetermined volume of photosensitive material or resin, an elevating platform immersed in the resin tank, and a light source, such as a projector or a laser, for generating curing light to solidify a plurality of thin layers with a given layer thickness to form a 3D object which is attached on the elevating platform.

The entire Stereolithography process may be broken down into the following steps: resin filling, light exposure, separation of the solidified section from the vat or reservoir, and replenishing the photosensitive resin. Due to the inefficient material replenishment and separation processes, most conventional SLA processes have a slow fabrication speed. Also, separation of the polymerized cross-sections from the reservoir creates a huge suction force that can lead into fracture of the fabricated sections during the course the printing process.

Accordingly, it would be highly desirable to develop an SLA three-dimensional printing which is capable of increasing the fabrication speed of the 3D object and enhancing the quality of the 3D object while being cost effective. It is to these ends that the present invention has been developed.

BRIEF SUMMARY OF THE INVENTION

The present invention provides an apparatus, system, and method for use in three-dimensional printing—for example Stereolithography (SLA)—wherein an air permeable, textured and or tensioned film may be formed to create a minimum and negligible suction force for separating the cured layers from the film.

A system for three-dimensional printing, in accordance with some exemplary embodiments of the present invention, may include: a computer coupled to a light source including instructions for selectively illuminating a photosensitive liquid in accordance with a geometric profile of a three-dimensional (3D) object, the light source for polymerizing the photosensitive liquid and forming a polymerized section of the 3D object; and reservoir assembly adapted to receive the light source, comprising: a top frame having a cavity with an aperture defined on a bottom edge of the top frame, the cavity configured to be at least partially filled with the photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a media layer sandwiched between the permeable film and the rigid substrate of the bottom frame.

In some embodiments, a system for three-dimensional printing, may include: a computer coupled to a light source including instructions for selectively illuminating a photosensitive liquid in accordance with a geometric profile of a three-dimensional (3D) object, the light source for polymerizing the photosensitive liquid and forming a polymerized section of the 3D object; and reservoir assembly adapted to receive the light source, comprising: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame.

In some embodiments, either the transparent or semi-transparent rigid substrate and or the permeable film, or both, are treated to create a microstructure with multiple air channels. In some exemplary embodiments, the transparent or semi-transparent rigid substrate comprises a glass surface that has been chemically treated to create the microstructure formed therein to allow air to travel through the permeable film and further decrease the separation forces during a three-dimensional printing process. In some exemplary embodiments, the transparent or semi-transparent rigid substrate comprises a glass surface that has been sandblasted to create the microstructure.

In some exemplary embodiments, either the transparent or semi-transparent rigid substrate and or the permeable film, or both, are treated to create the microstructure with multiple air channels, but a permeable substrate is not utilized. In those embodiments, a system for three-dimensional printing may include: a computer coupled to a light source including instructions for selectively illuminating a photosensitive liquid in accordance with a geometric profile of a three-dimensional (3D) object, the light source for polymerizing the photosensitive liquid and forming a polymerized section of the 3D object; and reservoir assembly adapted to receive the light source, comprising: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; and a bottom frame including a transparent or semi-transparent rigid substrate, the bottom frame configured to register with the top frame, wherein either the transparent or semi-transparent rigid substrate, and or the permeable film, or both, are treated to create the microstructure with multiple air channels, said microstructure configured to reduce a separation force during the 3D printing process.

A reservoir assembly for use in three-dimensional printing, in accordance with some exemplary embodiments of the present invention, may include: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a media layer sandwiched between the permeable film and the rigid substrate of the bottom frame.

In some exemplary embodiments, a reservoir assembly for use in three-dimensional printing, may include: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame.

In some exemplary embodiments, a reservoir assembly for use in three-dimensional printing, may include: a top frame having a cavity with an aperture defined on a bottom edge of the top frame, the cavity configured to be at least partially filled with a photosensitive liquid; a polymethylpentene permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame, wherein the permeable substrate comprises a total opened area of between 40% and 55%. In some exemplary embodiments, the permeable substrate comprises a total opened area of between 80-90%.

In some exemplary embodiments, a reservoir assembly for use in three-dimensional printing, may include: a top frame having a cavity with an aperture defined on a bottom edge of the top frame, the cavity configured to be at least partially filled with a photosensitive liquid, wherein a deep portion of the cavity is defined by a peripheral shallow portion extending from an inner side wall of the top frame to a curving edge, and a deep inner side wall extending from the curving edge that perimetrically defines the aperture; a polymethylpentene (PMP) film wrapped around a holding rim of the top frame so that PMP film is tensionedly coupled to the aperture in a manner to hold the photosensitive liquid within the cavity of the top frame; a bottom frame including a transparent or semi-transparent rigid substrate, the bottom frame configured to register with the top frame; and a media layer sandwiched between the permeable PMP film and the rigid substrate of the bottom frame in a manner so that the PMP film is suspended above the media layer.

In one aspect of the present invention, a substrate assembly for use with a three-dimensional printer reservoir is disclosed, wherein the reservoir includes a frame defining a cavity adapted to be at least partially filled with a photosensitive liquid. In some exemplary embodiments, the substrate assembly may include: a first layer comprising a permeable film adapted to be configured with a lower portion of the cavity and to hold the photosensitive liquid within the cavity; a second layer configured below the first layer; and a third layer comprising a permeable substrate disposed between the first layer and the second layer.

In some exemplary embodiments, the substrate assembly may include: a permeable film adapted to be configured with a lower portion of the cavity and to hold photosensitive liquid within the cavity; and a permeable substrate configured below the permeable film, wherein a surface of the permeable film and/or a surface of the permeable substrate includes at least one airway.

In one aspect of the present invention, a substrate assembly for use with a three-dimensional printer reservoir is disclosed, wherein the reservoir includes a frame defining a cavity adapted to be at least partially filled with a photosensitive liquid. In some exemplary embodiments, the substrate assembly may include: a permeable film adapted to be configured with a lower portion of the cavity and to hold the photosensitive liquid within the cavity; a projection lens of a stereolithography projector configured below the first layer; and a permeable substrate disposed between the first layer and the second layer.

While in some exemplary embodiments the film may be wrapped around a portion of the top frame, in other exemplary embodiments, a high performance elastic double-sided adhesive may be implemented around a bottom surface of top frame. In yet other exemplary embodiments, the film may be both wrapped around a portion of the top frame and secured to a portion of top frame using an adhesive component. With either embodiment, the tensioning process may be performed in a hot liquid bath or a hot air chamber for achieving maximum tension on the film.

A method for three-dimensional printing using a reservoir assembly employing a permeable film suspended over a media layer, in accordance with some exemplary embodiments of the present invention, may include: (a) coupling a permeable film to a top frame of a reservoir assembly having a cavity with an aperture defined on a bottom edge of the top frame, wherein: the cavity is configured to be at least partially filled with a photosensitive liquid, the permeable film is stretchily coupled to the aperture so as to hold the photosensitive liquid within the cavity of the top frame, and the permeable film is suspended above a media layer disposed between the permeable film and a transparent or semi-transparent rigid substrate of a bottom frame of the reservoir assembly; (b) filling at least a portion of the cavity with the photosensitive liquid so that the photosensitive liquid rests on a top portion of the permeable film; and (c) projecting a light to a bottom surface of the permeable film in order to polymerize the photosensitive liquid above the film and form a polymerized section of a three-dimensional (3D) object.

A method of assembling a reservoir for use in three-dimensional printing, in accordance with some exemplary embodiments of the present invention, may include: (a) stretching a permeable film over an aperture of a top frame of a reservoir assembly having a cavity with the aperture defined on a bottom edge of the top frame in order to create a permeable film; and (b) coupling the permeable film to the aperture in a manner so as to create a seal between the permeable film and the bottom edge of the top frame such that the permeable film will hold a photosensitive liquid within the cavity of the top frame, wherein steps (a) and (b) are performed in a hot liquid bath or a hot air chamber so as to allow the film to expand when being stretched and coupled over the aperture of the bottom section of the top frame; and (c) suspending the permeable film over a media layer disposed between the permeable film and a transparent or semi-transparent rigid substrate of a bottom frame of the reservoir assembly.

In some exemplary embodiments of the present invention, a method may be implemented via DLP-based, LCD-based, or laser-based Stereolithography printing using an enhanced 3D printing material vat or reservoir assembly with a semi-transparent window.

In some exemplary embodiments of the present invention, an apparatus and a method may include or incorporate a reservoir assembly for Stereolithography 3D printing that comprises (i) a two-part design with a flat bottom surface and a removable top surface; (ii) a non-transparent or semi-transparent Selectively Textured Elastomeric Membrane (STEM) on the removable top surface that becomes transparent when it comes in contact with resin; and (iii) removable or non-removable surface enhancement filters underneath of the flat transparent part.

In some exemplary embodiments of the present invention, an apparatus and a method may include or incorporate a semi-transparent or non-transparent surface on direct contact of Stereolithography 3D printing material that: (i) creates a minimum and negligible suction force because of the surface textures; (ii) becomes transparent when it comes in contact with Stereolithography 3D printing material; and (iii) enhances the surface finish by blurring the projected images.

In some exemplary embodiments of the present invention, an apparatus and a method may include or incorporate a tensioned film that provides physical and chemical properties to separate the printed 3D object from a bottom surface of the reservoir assembly.

In some exemplary embodiments of the present invention, an apparatus and a method may be incorporated with any existing computer-aided design to build a 3D object.

In some exemplary embodiments of the present invention, a system is provided that is easy to use without assistance, and inexpensive to manufacture.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The apparatus, system, and method for use in stereolithography three-dimensional printing as disclosed herein are further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows.

DETAILED DESCRIPTION OF THE INVENTION

Figure 1:
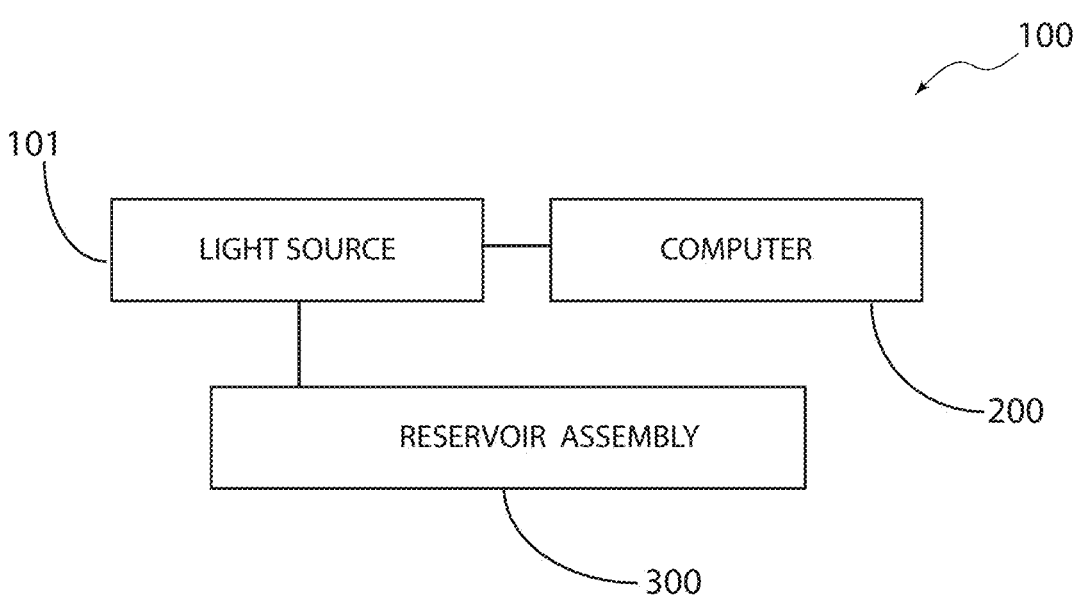
FIG. 1 is a system for use in three-dimensional printing according to an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

For purposes of this disclosure, the terms "upper", "lower", "right", "left", "rear", "front", "vertical", "horizontal" and derivatives thereof shall relate to the invention as oriented in the figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

As used in this disclosure, the term "comprise" and variations of the term, such as "comprising" and "comprises," are not intended to exclude other additives, components, ingredients or steps.

The present disclosure relates to, among other things, an apparatus, system and method for use in three-dimensional printing for building a 3D object. Exemplary embodiments of the present disclosure are described with reference to the drawings for illustration purposes and are not intended to limit the scope of the present disclosure.

Turning now to the figures, and particularly to FIG. 1, an exemplary system for use in three-dimensional printing in accordance with the present invention is depicted. More specifically, FIG. 1 illustrates system 100 comprising a light source 101, such as a projector or a laser, being controlled by a computer 200, and a reservoir assembly 300. In some exemplary embodiments, light source 101 may be a projector that uses Digital Light Processing (DLP) technology such that the projector is a DLP-based projector. In some exemplary embodiments, light source 101 may be a projector that uses a liquid-crystal display (LCD) technology such that the projector is an LCD-based projector. In some exemplary embodiments, light source 101 may be a projector that uses liquid crystal on silicon (LCOS) technology such that the projector is a LCOS-based projector.

Computer 200 may be any type of computer suitable for 3D printing such as a 3D modeling computer, wherein a computer-aided design program and/or software may be installed to configure a 3D object with coordinates in 3D space. The data of coordinates of the 3D object may be typically transferred to the computer 200, wherein the data is further processed to obtain geometric profiles for each slicing layer that makes up the 3D object. The light source 101 may be generally controlled by the computer 200 to selectively illuminate a liquid material surface or resin surface within reservoir assembly 300.

Figure 2:
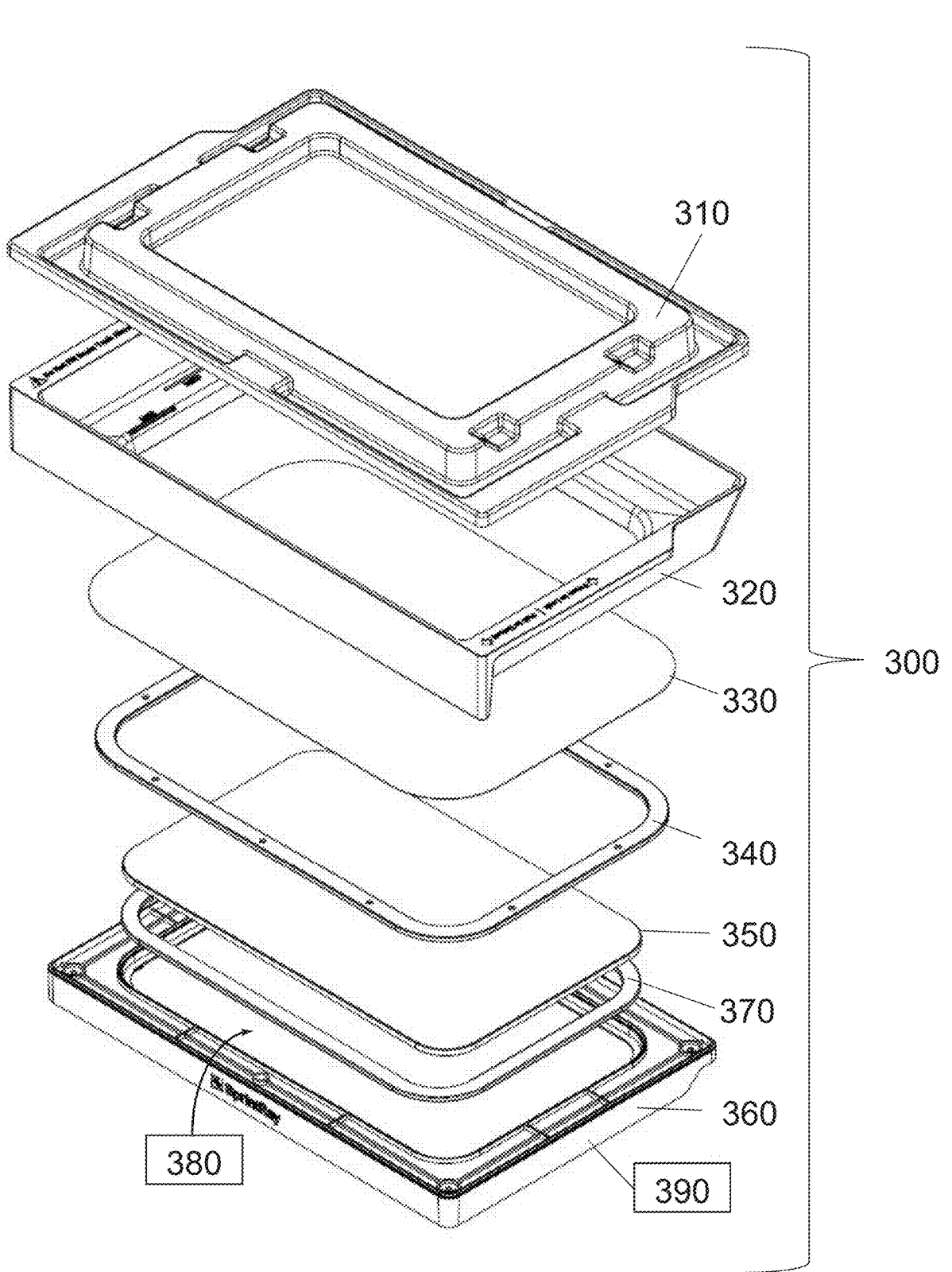
FIG. 2 is an exploded perspective view of a reservoir assembly of an exemplary system according to the present invention.

Turning now to the next figure, FIG. 2 illustrates an exploded perspective view of a reservoir assembly of an exemplary system according to the present invention. More specifically, FIG. 2 depicts reservoir assembly 300, which is configured to facilitate polymerizing a resin or photosensitive liquid material disposed over a permeable tensioned film; as will be discussed in more detail below, the permeable tensioned film may be selectively textured, non-stick and elastic at the same time.

Generally, reservoir assembly 300 comprises a lid 310, a top frame 320, a tensioned film 330, a tensioning ring 340, a rigid substrate 350, and a bottom frame 360 coupled with each other from top to bottom. As will be discussed further below, in some exemplary embodiments, the tensioned film 300 (for example, and without limitation, a permeable selectively textured, non-stick and elastic tensioned film), may be wrapped around the tensioning ring 340. In other exemplary embodiments, tensioning and securing tensioned film 330 to top frame 320 may comprise using high performance elastic double-sided adhesives to secure the tensioned film 330 to the tensioning ring 340 or another portion of the top frame 320. Because in some exemplary embodiments supplying a gas through the permeable tensioned film 330 may be advantageous, the reservoir assembly 300 may further comprise a gas supplying module 390 having a gas outlet (not shown) connected thereto for supplying gas, such as air or oxygen, to the bottom of the tensioned film 330. Typically, as better shown in other views discussed below, a media layer 330a may be disposed between the permeable tensioned film 330 and the rigid substrate 350 of the bottom frame 360 in a manner so that the permeable tensioned film 330 is suspended above the media layer 330a.

Accordingly, a reservoir assembly 300 for use in three-dimensional printing may typically comprise of a top frame 320 having a cavity (see for example cavity 322 in FIG. 3) with an aperture (see for example aperture 325b in FIG. 4) defined on a bottom edge of the top frame 320, the cavity 322 configured to be at least partially filled with a photosensitive liquid; a permeable tensioned film 330 stretchily coupled to the aperture 325b so as to hold the photosensitive liquid within the cavity of the top frame 320; a bottom frame 360 including a transparent or semi-transparent rigid substrate 350, the bottom frame 360 configured to register with the top frame 320; and a media layer 330a disposed between the permeable tensioned film 330 and the rigid substrate 350 of the bottom frame 360 in a manner so that the permeable tensioned film 330 is suspended above the media layer 330a.

Figure 3:
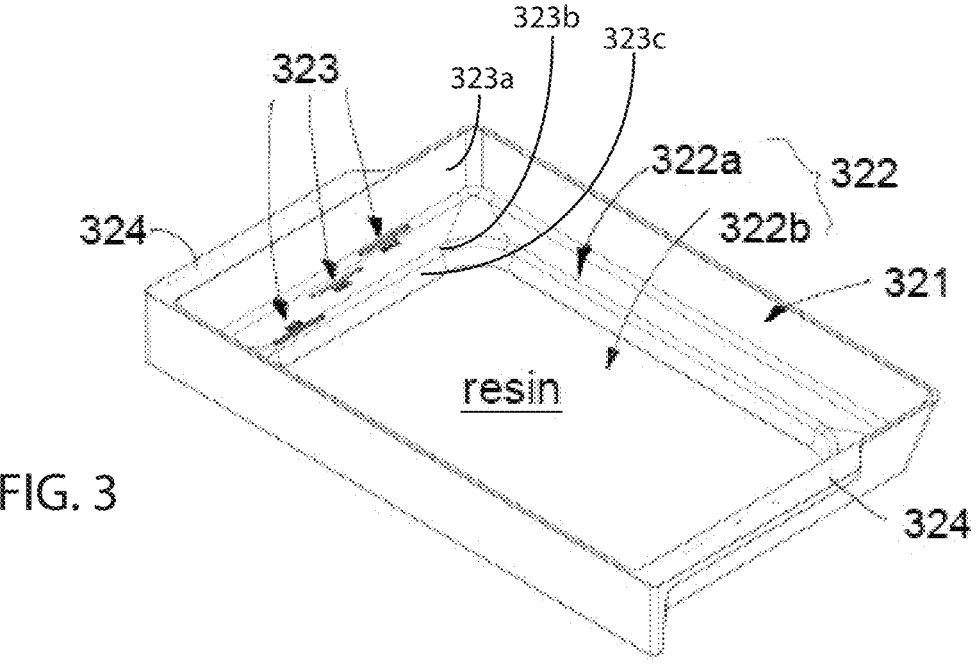
FIG. 3 is a top perspective view of a top frame of a reservoir assembly according to an exemplary embodiment of the present invention.
Figure 4:
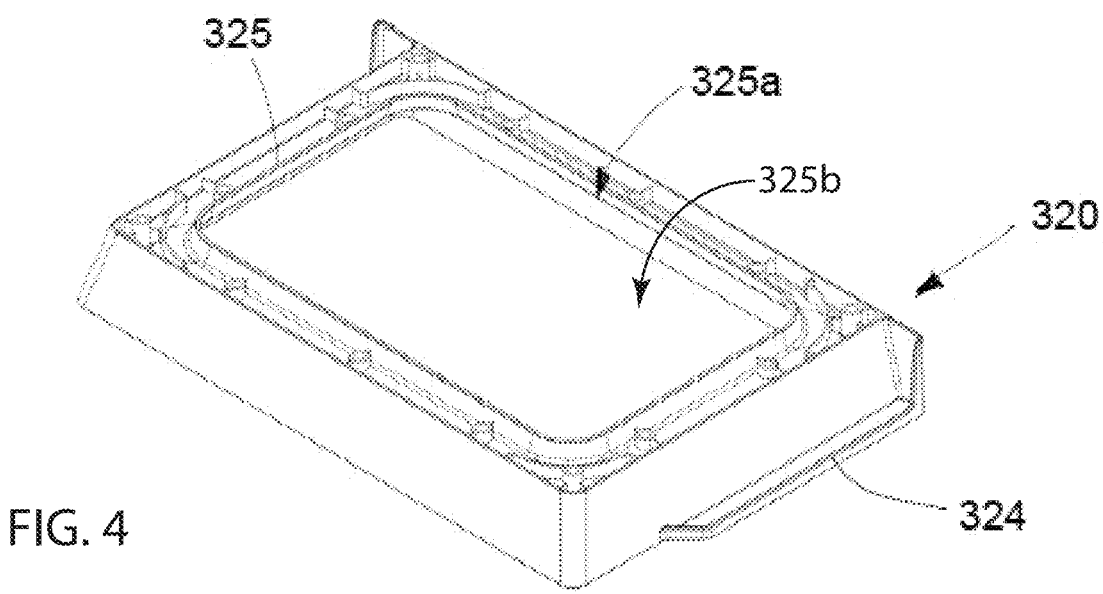
FIG. 4 is a bottom perspective view of a top frame of a reservoir assembly according to an exemplary embodiment of the present invention.
Figure 5:
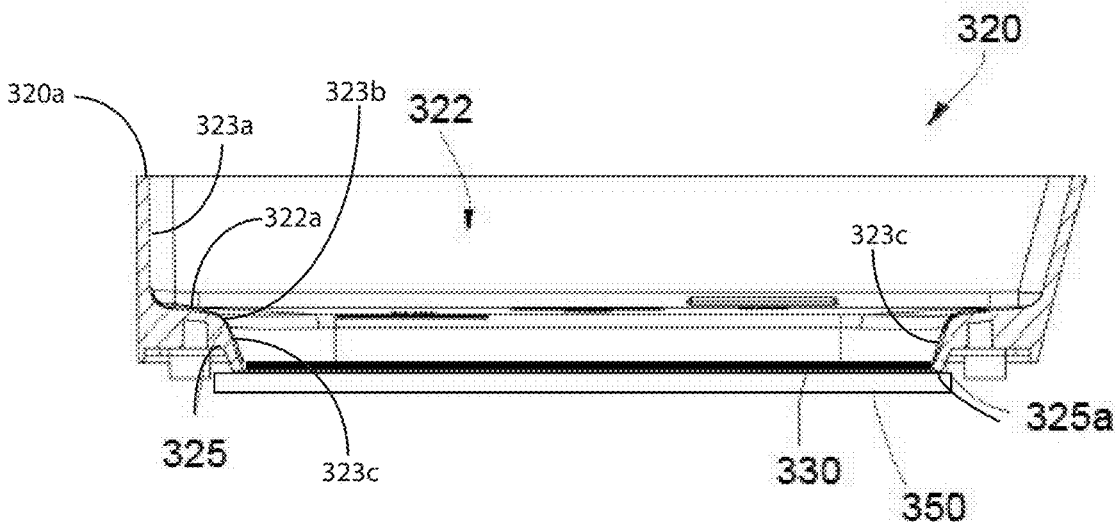
FIG. 5 is a cross-sectional view of a top frame of a reservoir assembly according to an exemplary embodiment of the present invention.
Figure 5A:
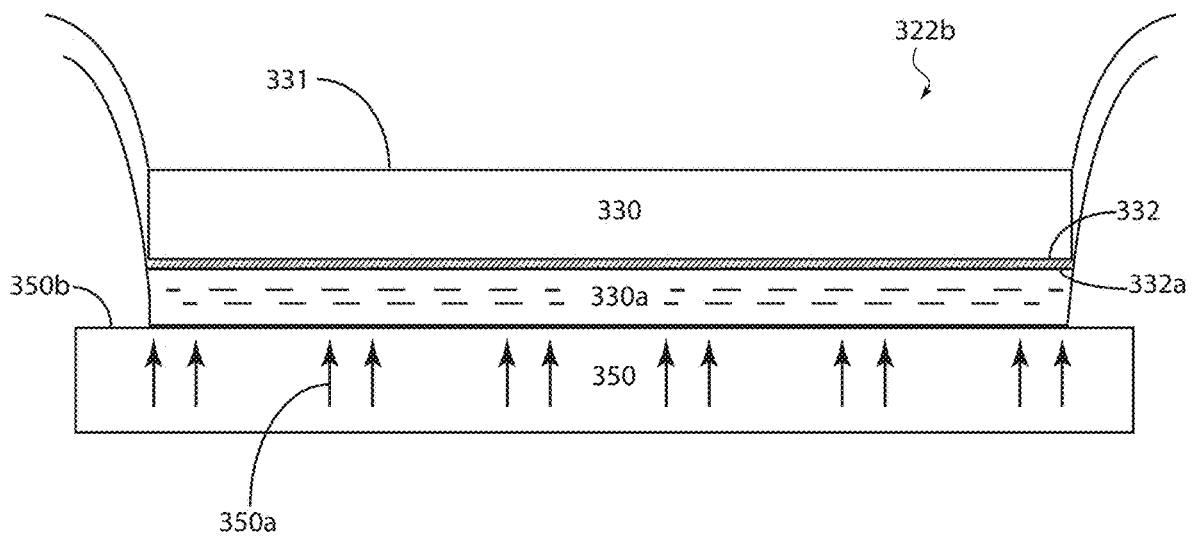
FIG. 5A is a diagram showing an exemplary cross-section of a top frame coupled to a portion of a bottom frame of a reservoir assembly according to an exemplary embodiment of the present invention.

Turning now to the next set of figures, FIG. 3 is a top perspective view of a top frame of a reservoir assembly according to an exemplary embodiment of the present invention; FIG. 4 is a bottom perspective view thereof; FIG. 5 is a cross-sectional view thereof; and FIG. 5A is a diagram showing an exemplary cross-section of top frame 320 coupled to a portion of bottom frame 360 of reservoir assembly 300.

FIG. 3 through FIG. 5 depict the top frame 320, wherein the top frame 320 is arranged to fill with and hold a predetermined liquid material, such as resin or any other material that is photosensitive and suitable for 3D printing. The top frame 320, together with the tensioned film 330, creates a container for the liquid material to reside in during the printing process. The top frame 320 has a top opening 321 and a cavity 322, wherein the cavity 322 has a depth difference between the peripheral portion and the central portion, so that the cavity 322 of top frame 320 defines a peripheral shallow portion 322a and a center deep portion 322b. This design, in accordance with some exemplary embodiments of the present invention, defines a region (for example, the center deep portion 322b within cavity 322) for the liquid material to easily accumulate in, which facilitates efficient use of available liquid material.

As may be appreciated from FIG. 5 discussed below, in some exemplary embodiments, the cavity 322 may be initially defined by an inner side wall 323a of top frame 320 that extends downward from a top perimeter 320a of top frame 320 to a first inner surface or peripheral shallow portion 322a; cavity 322 is further defined by an edge 323b of the peripheral shallow portion 322a which terminates the peripheral shallow portion 322a to form a deep inner side wall 323c that perimetrically defines aperture 325b that when covered with the tensioned film 330 forms or defines the center deep portion 322b of the cavity 322 of the top frame 320. In exemplary embodiments, deep inner side wall 323c maybe slanted slightly so that a top region of the deep inner side wall has a greater perimeter than a bottom region of the deep inner side wall 323c. As mentioned above, this staggered or step configuration helps collect the liquid material at the center deep portion 322b of the reservoir, which facilitates the utilization of the liquid material in the reservoir assembly 300. Without this feature, the liquid material may spread to an entire reservoir surface, requiring more liquid material to be held in the reservoir assembly 300 for the same print job. As such, in exemplary embodiments, deep portion 322b of cavity 322 is configured to collect the photosensitive liquid within the reservoir assembly 300, the deep portion 322b defined by: peripheral shallow portion 322a extending from inner side wall 323a of the top frame 320 to a curving edge 323b; and a deep inner side wall 323c extending from the curving edge 323b that perimetrically defines the aperture 325b.

In exemplary embodiments, reservoir assembly 300 may include a cover, for example and without limiting the scope of the present invention, reservoir assembly 300 may include lid 310, which may be placed on top of the top frame 320 to enclose cavity 322 of top frame 320 of the reservoir assembly 300 and protect the liquid material filled therein.

In some exemplary embodiments, top frame 320 may further comprise one or more liquid volume indicators 323 at the peripheral shallow portion 322a of the cavity 322 to indicate the volume of the liquid material within cavity 322. In some exemplary embodiments, the liquid volume indicator 323 is one or more visual guides that may be formed, etched, carved, painted, labeled, or otherwise marked on different surfaces of the peripheral shallow portion 322a of the cavity 322 to visually provide users with an indication of how much liquid material is available for printing. For example, and without limiting the scope of the present invention, because peripheral shallow portion 322a may be, in some exemplary embodiments of the present invention, generally slightly slanted towards the center deep portion 322b formed within the cavity 322 of top frame 230, a first indicator for indicating a maximum liquid material capacity may be situated on an edge between the peripheral shallow portion 322a and inner side wall 323a of top frame 320; a second indicator for indicating a medium liquid material capacity may be situated on the peripheral shallow portion 322a some distance between inner side wall 323a of top frame 320 and an edge 323b of the peripheral shallow portion 322a; and a third indicator for a minimum liquid material capacity may be situated at the edge 323b of the peripheral shallow portion 322a where the peripheral shallow portion 322a terminates and deep inner side wall 323c perimetrically defines the center deep portion 322b.

In some exemplary embodiments, top frame 320 may further comprises one or more hand grips 324 extended peripherally and outwardly to help remove reservoir assembly 300 from the printer fixture and place it back in position.

In FIG. 4 and FIG. 5, other characteristics of some exemplary embodiments of top frame 320 may be appreciated. For example, in some exemplary embodiments such as the one presently shown, the top frame 320 and more specifically an outer surface of the deep inner side wall 323c may form a holding rim 325 that supports tensioned film 330 and acts as a sealing wall to prevent any liquid material from spilling between the top frame 320 to the bottom frame 360. In some exemplary embodiments, film 330 may be wrapped around holding rim 325 to achieve a suitable tension. In other exemplary embodiments, a high performance elastic double-sided adhesive may be implemented around a top surface of tensioning ring 340 and or a bottom surface of top frame 320—for example along the channel 325c formed by holding rim 325 that is configured to receive tensioning ring 340—in order to secure the tensioned film 330 to top frame 320 in a manner that seals cavity 322 an prevents any liquid material stored within top frame 320 from spilling. For example, and without limiting the scope of the present invention, in exemplary embodiments that employ such adhesive, a high performance elastic double-sided adhesive tape such as the 3M™ VHB™ Tape 4952 may be employed; such component may be useful because the adhesive tape can replace mechanical fasteners or liquid adhesives and generally creates a permanent seal to keep the liquid material within cavity 322 of top frame 320. Typically, holding rim 325 includes a holding edge 325a that meets the bottom peripheral portion of the deep inner side wall 323c of the top frame 320. The holding edge 325a forms a structural base to retain the tensioned film 330 in a manner such that the tensioned film 330 is held underneath the top frame 320 in a tensioned manner.

In accordance with some exemplary embodiments of the present invention, a reservoir assembly 300 for use in three-dimensional printing, may include: a top frame 320 having a cavity 322 with an aperture defined on a bottom edge of the top frame 320, the cavity 322 configured to be at least partially filled with a photosensitive liquid; a tensioned film 330 (that may be preferably a permeable film) stretchily coupled to the aperture so as to hold the photosensitive liquid within the cavity 322 of the top frame 320; a bottom frame 360 including a transparent or semi-transparent rigid substrate 350, the bottom frame 360 configured to register with the top frame 360; and a media layer 330a sandwiched between the permeable tensioned film 330 and the rigid substrate 350 of the bottom frame 360. While in some exemplary embodiments film 330 may be wrapped around holding rim 325 to achieve a suitable tension, in other exemplary embodiments, a high performance elastic double-sided adhesive may be implemented around a bottom surface of top frame 320 (for example, and without limiting the scope of the present invention, at or about holding rim 325). In yet other exemplary embodiments, tensioned film 330 may be both wrapped around holding rim 325 and secured to a portion of top frame 320 using an adhesive component as mentioned above. Whatever the tensioning process that may be employed in accordance with the present invention, the tensioning may be achieved in a hot liquid or hot air chamber. As may be appreciated by a person of ordinary skill in the art, performing the tensioning process—whether wrapping, adhering, or a combination of both—upon cooling, the film may achieve a maximum tension.

In order to improve the tensioning of tensioned film 330, an exemplary assembly process in accordance with the present invention may be employed. An exemplary assembly process is shown in more detail and explained with reference to FIG. 10A-FIG. 10B, which illustrate two views that generally describe the process of assembling a tensioned film on the top frame, according to the present invention.

In exemplary embodiments of the present invention, tensioned film 330 may be a Selectively Textured Elastomeric Membrane (STEM) film that has a non-stick surface. In some exemplary embodiments, the STEM film may include Polymethylpentene (PMP). The material is commonly referred to as TPX®, which is a trademark of Mitsui Chemicals. The material may be typically used in gas permeable packing industry. Polymethylpentene melts at ≈235° C., and it has a density of about 0.84 g/cm³. The gas permeability of TPX® may be around 30 Barrer. In some exemplary embodiments, a PMP material is transparent, but the surface of the PMP material may be textured to provide an improved non-stick property.

Implementation of a STEM film for tensioned film 330 may provide several advantages. Typical Stereolithography systems either use flexible films (PTFE) that flexes and causes the separation of the polymerized sections or an oxygen-permeable gel type material, e.g., Polydimethylsiloxane (PDMS), that creates the inhibition of the polymerization process at its surface and leads to a minimal separation force. In some exemplary embodiments of the present invention, however, tensioned film 330 may be a STEM film that integrates the advantages from both PTFE films as well as oxygen-permeable gel type materials such as PDMS. For example, and without limiting the scope of the present invention, tension film 330 may include a STEM film that includes PMP so as to provide a greater gas permeability that creates a minimal suction force; moreover, a STEM film that includes PMP flexes as a part arm (i.e. a platform of system 100 such as exemplary platform 400) pulls up and the part (being printed or fabricated using system 100) starts to separate from the part arm. The STEM film that includes PMP generally includes a high yield stress which makes it rigid while allowing for fast energy recovery. The PMP material also allows the molecules of oxygen to pass through the tensioned film 330 to create an anti-cure effect that is similarly desirable.

In some exemplary embodiments, in order to fully benefit from both flexibility and gas permeability, a media layer 330a may be employed. For example, and without limiting the scope of the present invention, in some exemplary embodiments tensioned film 330 is a STEM film comprising PMP that is suspended over a media layer 330a, wherein the media layer 330a is disposed between a top surface 350b of the transparent rigid substrate 350 and a bottom surface 332a of the tensioned film 330 (see for example FIG. 5A). In exemplary embodiments, as shown in FIG. 5A, the bottom surface 332a of tensioned film 330 may be a textured or micro-textured surface as described in this disclosure in order to provide various benefits as will be discussed below. Notably, without media layer 330a, a secondary suction force between tensioned film 330 and rigid substrate 350 may make separation more stringent and thus slow down the process and efficiency of system 100.

In some exemplary embodiments, media layer 330a could be in the form of a gas. For example, and without limiting the scope of the present invention, the gas may include air, nitrogen, or oxygen. In some exemplary embodiments, media layer 330a could be in the form of a liquid. For example, and without limiting the scope of the present invention, the liquid may include water, or oil. In some exemplary embodiments, media layer 330a could be in the form of a semi-liquid material. For example, and without limiting the scope of the present invention, the semi-liquid material may include a gel, or any other rubber like materials. In exemplary embodiments, employing medial layer 330a may be achieved through the assembly process by, for example and without limiting the scope of the present invention, leaving a desired clearance between a top surface 350b of the transparent rigid substrate 350 and a bottom surface 332 of the tensioned film 330.

In exemplary embodiments, a typical thickness of media layer 330a may be between 0.05 mm to 0.25 mm. Notably, too great of a thickness may affect accuracy of some Stereolithography-based 3D printing systems, whereas too small of a thickness may not significantly facilitate the separation process. This may be apparent upon illustration of what occurs during the separation process: Before the projection starts at a specific layer, a previously polymerized section or even a bottom surface of an elevator platform (see for example FIG. 9) and a top surface 331 of the tension film 330 will sandwich a thin layer of liquid material such as a photosensitive resin within cavity 322 of top frame 320. Because of the pressure from the elevator platform, the tensioned film 330, directly suspended over media layer 330a, will be pushed towards the rigid substrate 350 to contact or substantially contact the rigid substrate 350. Due to the existence of the media layer 330a which is usually soft and compressible, the pressure caused by the tensioned film 330 being pushed towards the rigid substrate 350 will deform the media layer 330a at least to the extent of an area covered by the platform or previously polymerized section below the platform. In some exemplary embodiments, media layer 330a may be configured such that during its deformation caused by the tensioned film 330 being pushed towards the rigid substrate 350, other areas of the media layer 330a that are not covered by the platform or previously polymerized section below the platform of the system 100, retain an original geometry. In any event, in some exemplary embodiments of the present invention, as shown by way of example in FIG. 11A-FIG. 11D, the thickness difference between the portion of the media layer 330a that is compressed and the non-compressed media layer may create a curvature on the tensioned film 330 having a tangent angle of approximately between 2°-4°. Then, during the separation process, when the pressure is released, the tensioned film 330 and the media layer 330a tend to recover their original states. The detachment of the tensioned film 330 from the media layer 330a or the transparent rigid substrate 330 first starts at the border (curved area), and then propagates towards the center until completely separated. The curvature caused by the difference in height helps to convert a separation in normal direction into a peeling process, where the later one is much easier to realize in terms of the magnitude of the force. When air, or oxygen, is introduced through the tensioned film 330 to the bottom of the liquid material, the liquid material is not fully polymerized, therefore there is a thin layer of liquid resin between the polymerized sections and the tensioned film 330 which can reduce the suction forces of the polymerized section for the separation of the polymerized sections from the reservoir assembly 300. Accordingly, in some exemplary embodiments, the reservoir assembly 300 may further comprise a gas supplying module 390 having a gas outlet connected thereto for supplying gas, such as air or oxygen, to the bottom of the tensioned film 330.

As mentioned above, the tensioned film 330 is coupled at the bottom of the cavity 322 of the top frame 320 to retain the liquid material therein, wherein the liquid material cannot pass through the tensioned film 330 from its top surface to its bottom surface. The tension and strength of the tensioned film 330 should be strong enough to hold the liquid material within the cavity 322 of the top frame 320 without penetrating through the tensioned film 330 to the rigid substrate 350 and bottom frame 360. On the other hand, the air is able to pass through the tensioned film 330 due to the gas permeability of the tensioned film 330, wherein the air is guided to penetrate through the tensioned film 330 from the bottom surface to the top surface. Therefore, the oxygen in the air will prevent polymerization at the top surface of the tensioned film 330. As mentioned above, this will reduce the suction force as the liquid material is not fully polymerized at the bottom of the reservoir, and therefore, reduce the adhesion force between the newly solidified section and the top surface of the tensioned film 330. In tis way, the 3D object being formed may be easily separated from the tensioned film 330 in a manner that prevents surface damage of the 3D object during the separation process.

In some exemplary embodiments, the tensioned film 330 may be semi-transparent, micro-textured to create a matte finish. In such exemplary embodiments, the surface finish for the overall texture of the textured surface may be between 0.2 μm to 0.4 μm thick. Such textured surface may provide multiple benefits-for example, and without limiting the scope of the present invention—one benefit may be to create a non-stick and or hydrophobic surface that reduces the adhesion of the polymerized parts to the tensioned film 330; the textured surface minimizes the creation of bubbles between the tensioned film 330 and the transparent rigid substrate 350. The textured surface also helps to blur the boundaries of the projected patterns, which enhances the surface finish of the fabricated parts. To these same ends, in some exemplary embodiments, the transparent rigid substrate 350 may also include a semi-transparent element with a predefined texture to blur the boundaries further to have a type of analogue anti-aliasing effect that smooths the edges of the projected patterns and thus facilitates fabrication of smoother 3D objects.

Tensioned film 330 is preferably retained in a tensioned manner for several reasons. Primarily, PMP, PPT, PPE or any other material with properties suitable for tensioned film 330 will typically allow a better diffusion of oxygen molecules when the material is stretched. In some exemplary embodiments, a thickness of a tensioned film 330 comprising PMP may be between 0.05 mm and 1 mm when stretched. Stretching or tensioning also creates a flat surface while polymerization happens. Tensioning may be achieved by various methods without limiting the scope of the present invention, however, in some exemplary embodiments, structural components may facilitate tensioning. For example, a structural design of the bottom section of the top frame 320 as shown in FIG. 4 may include features or characteristics that facilitate a stretched, tensioned configuration of tensioned film 330.

In exemplary embodiments, tensioned film 330 is secured on the bottom of the top frame 320 at first, and then the tensioning ring 340, as shown in FIG. 2, which is made from metal or plastic, may be placed on top of it. Since the tensioned film 330 is rigid and has a substantial thickness (125 microns-500 microns), it is difficult to stretch. Thus, in some exemplary embodiments, it may be desirable to apply heat. Applying heat may preferably include uniformly applying heat to tensioned film 330 in order to soften the tensioned film 330 on the edges, and subsequently stretch tensioned film 330 from all edges—for example uniformly from all 4 edges of a rectangular tensioned film 330. Subsequently, tensioned film 330 may be fastened, for example in the shown embodiment by screws, to secure tensioned film 330 in place. Typically, screws may puncture tensioned film 330 and secure the film in place. Accordingly, in some exemplary embodiments, tensioning ring 340 may include a plurality of screw holes formed around its perimeter in order to receive the screws therein. In exemplary embodiments, a thickness of tensioned film 330 may be selectively configured depending on the weight of the liquid material being used and the 3D object to be printed.

In exemplary embodiments, in order to apply sufficient tensioning on the tensioned film 330, a pre-tensioned tensioned film 330 such as a STEM film may be sandwiched between the top frame 320 and the tensioning ring 340, employing fasteners to hold the STEM film in place in a tensioned state. The top frame 320, the tensioned film 330 and the tensioning ring 340 are coupled together to form a reservoir for the liquid material, such that the tensioning ring 340 supports the tensioned film 330 so as to form a base structure to support the liquid material therein. This has advantages over other devices that may use a base frame instead of a tensioned film to support the liquid material. Moreover, incorporating tensioning ring 340 makes the entire top container more space efficient, and easier to assemble.

In fast 3D printing approaches requiring quicker printing cycles and in which rapid replenishment of resin is required, the flexibility of tensioned film 330 tends to be problematic during separation. This is because tensioned film 330 may deform and along with the 3D printed object being printed. The deformation may be for a certain distance until fully detached from the object. The travel of this distance takes time to finish, and it happens in every printing cycle. Therefore, it adds additional time to the entire cycle. Accordingly, in exemplary embodiments, a glue layer with substantial thickness may be used as media layer 330a to prevent tensioned film 330 from flexing undesirably. The type of glue used as media layer 330a may be in a semi-liquid state, have a high durometer number, be rubber like, be capable of absorbing and containing oxygen in it, and or otherwise suitable for generating a desirable flexibility of tensioned film 330. Moreover, the glue layer may act as a cushion when a part is pressed on it, further preventing the tensioned film 330 from flexing undesirably.

It should be appreciated that the tensioned film 330 can be integrated with the tensioning ring 340 to omit the screw engagement therebetween. The periphery of the tensioned film 330 may be pre-mounted at the tensioning ring 340 to retain the tensioned film 330 in a tension manner. Likewise, at least a portion of the tensioning ring 340 can be made of elastic material to apply an elastic stretching force to the tensioned film 330 to retain the tensioned film 330 in a tensioned manner.

In exemplary embodiments, transparent rigid substrate 350 may be a piece of glass, or any other optically clear flat material, such as but not limited to a polycarbonate, acylates panel that has a flat transparent surface. The transparent rigid substrate 350 may be arranged or positioned underneath the tensioned film 330, and configured to support the tensioned film 330 when a 3D object is being printed thereon. The tensioned film 330 may sit directly on the rigid substrate 350 due to the weight of the 3D object.

Preferably, although not necessarily, air can flow freely between the bottom of the tensioned film 330 and the rigid substrate 350, so that oxygen in the air can penetrate from the bottom side of the tensioned film 330 to the top side of the tensioned film 330 due to the permeability of the tensioned film 330. The oxygen can be utilized to prevent the liquid photosensitive resin at the interface of the tensioned film 330 from being fully polymerized. To these ends, in some exemplary embodiments, a flow of air attributes to air channels such as air channels 350*a,* which may be indented on the top surface of the rigid substrate 350. The air can pass along the air channels 350*a* to the bottom side of the tensioned film 330. The air channels 350*a* may be extended and spaced apart from each other along the longitudinal and transverse directions of the rigid substrate 350. In exemplary embodiments, the air channels 350 interconnect with each other so that the air or oxygen may be distributed uniformly at the bottom of the tensioned film 330; at the same time, rigid substrate 350 may still provide a solid flat surface to support the tensioned film 330.

In some exemplary embodiments, air channels 350*a* may be formed by curving grooves on the top surface 350*b* of the rigid substrate 350. Meanwhile, due to the texture on the sides of the tensioned film 330, when the tensioned film 330 sits on the rigid substrate 350, there still exist small gaps between the bottom side of the tensioned film 330 and the rigid substrate 350 at certain locations. These small gaps also facilitate the air flow between the tensioned film 330 and the rigid substrate 350 during printing.

The replenishment of the liquid material (such as a photosensitive resin) during printing is determined by the fluidity of the material which highly depends on the temperature, with low temperature compromising the resin replenishment. Also, low resin temperatures slow down the rate of reaction. Therefore, in cold environments, heating the liquid material in the reservoir assembly 300 to the room temperature increases the consistency of the polymerization behavior, and also facilitate the rate of reaction. To these ends, in exemplary embodiments, a metallic heat module 370 may be placed between the rigid substrate 350 and the bottom frame 360, as shown in FIG. 2. When heat module 370 is turned on, it generates heat and conducts the heat to the rigid substrate 350 which is in direct contact with the heat module 370. The rigid substrate 350 further transfers the heat to the liquid photosensitive resin through media layer 330*a* and the tensioned film 330.

Figure 6:
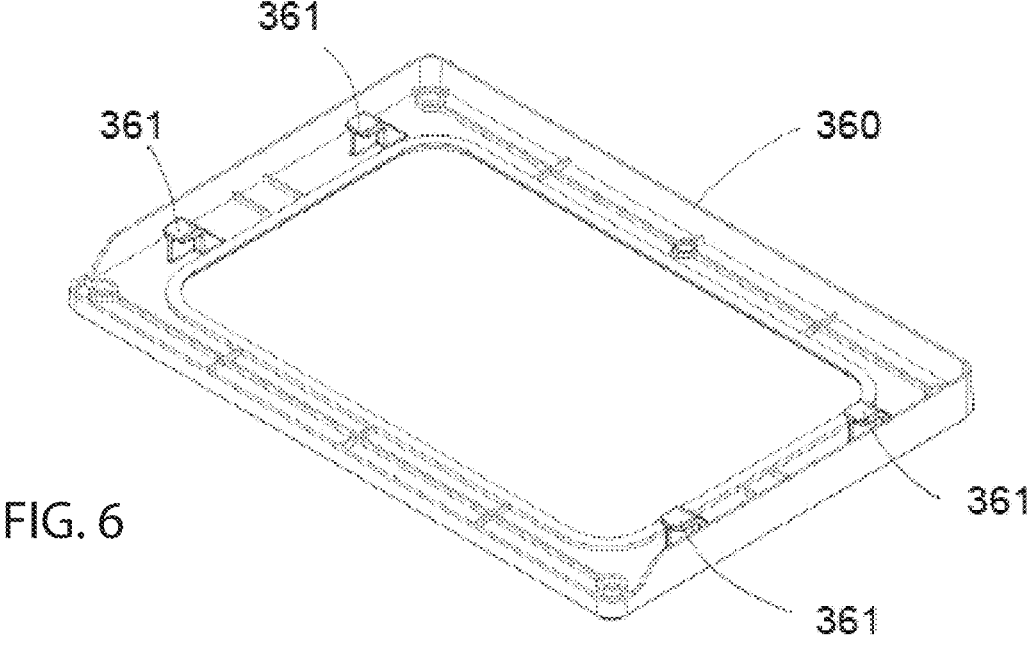
FIG. 6 is a bottom perspective view of a bottom frame of a reservoir assembly according to an exemplary embodiment of the present invention.
Figure 7:
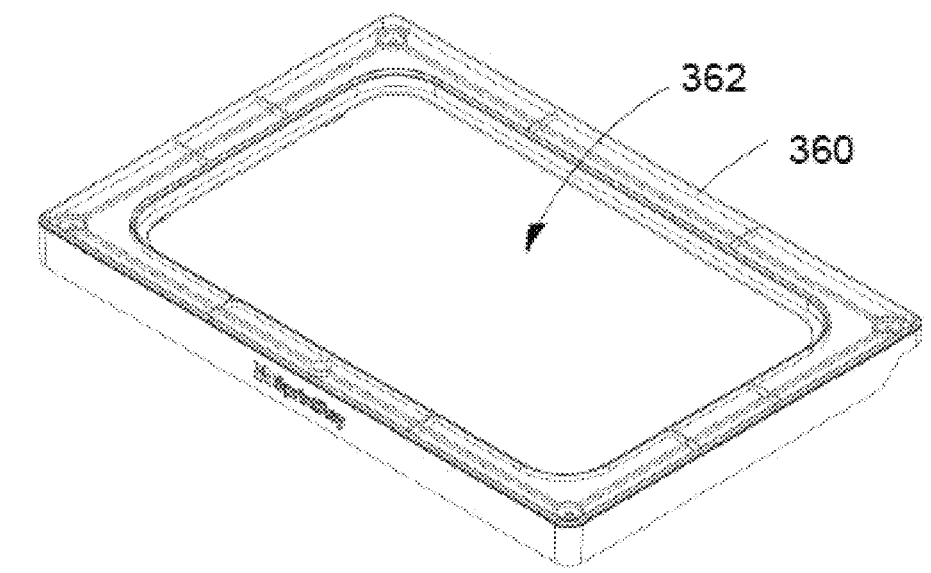
FIG. 7 is a top perspective view of a bottom frame of a reservoir assembly according to an exemplary embodiment of the present invention.
Figure 8:
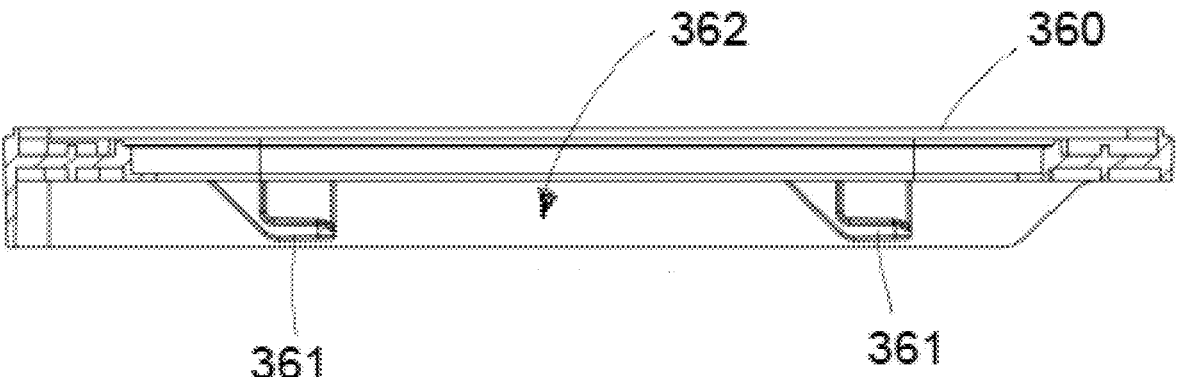
FIG. 8 is a cross-sectional view of a bottom frame of a reservoir assembly according to an exemplary embodiment of the present invention.

FIGS. 6 to 8 depict the bottom frame 360 that works as the base of reservoir assembly 300. Bottom frame 360 holds the optically clear rigid substrate 350, which in exemplary embodiments comprises a clear glass structure that is used to create a flat polymerization surface for the tensioned film 330. The bottom frame 360 may comprise one or more sliding hooks 361 provided at the bottom side of the bottom frame 360, wherein the sliding hooks 361 are used to secure the reservoir assembly 300 on the cradle of the 3D printer itself. The sliding hooks 361 prevent the reservoir assembly 300 from moving upward during the separation process. Other mechanisms could also be used, such as clamps, fasteners, screws, and other more complex systems, including but not limited to magnetic systems. In exemplary embodiments, bottom frame 360 together with rigid substrate 350 can be coupled with top frame 320 and tensioned film 330 by fasteners, such as screws and rivet.

Figure 12A:
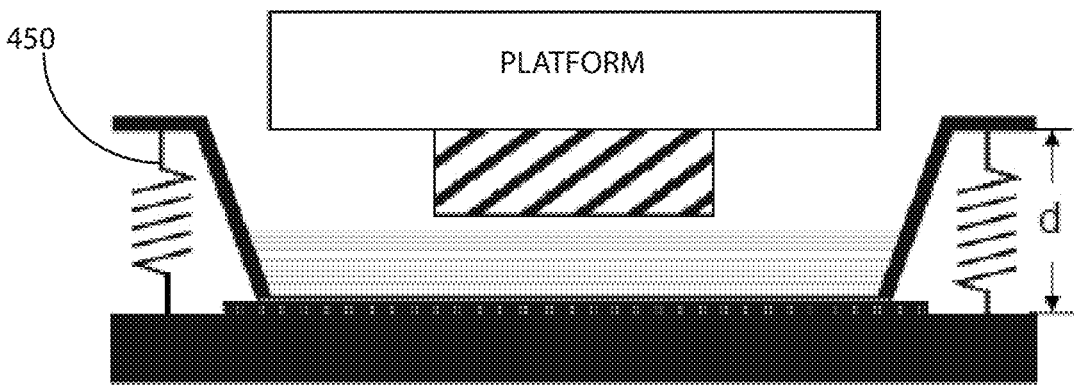
FIG. 12A-FIG. 12C illustrates a mechanism of using springs to couple a top frame and the bottom frame according to the present invention.
Figure 12B:
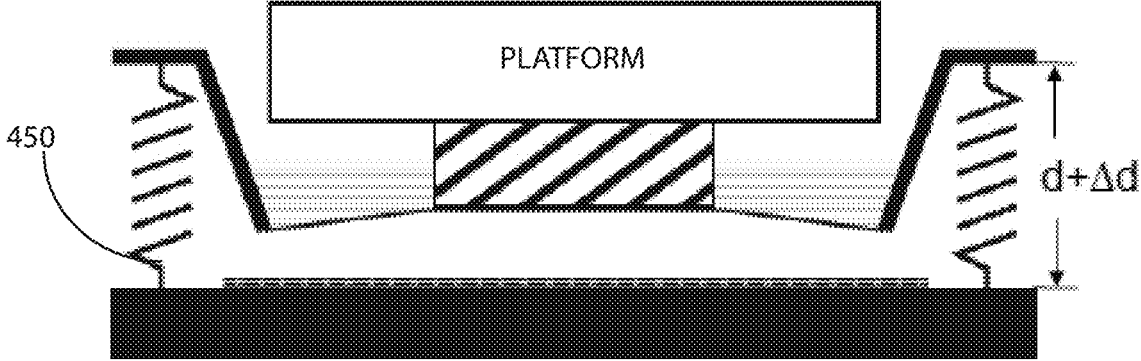
Figure 12C:
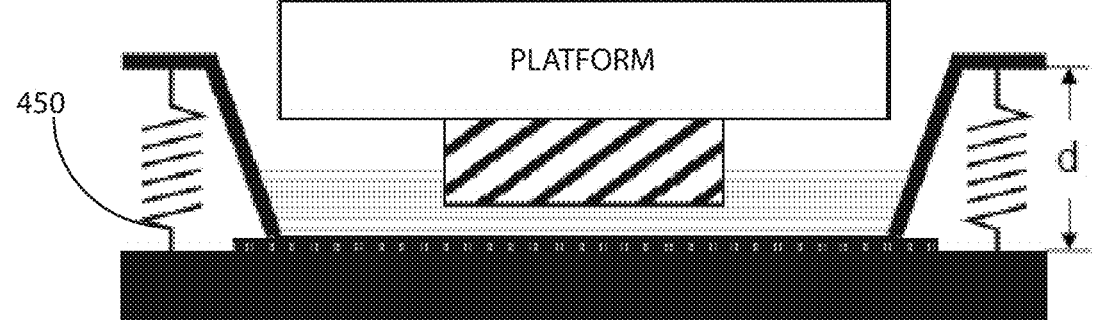

In some exemplary embodiments, bottom frame 360 and top frame 320 may employ at least one fastening mechanism or other similar force-generating mechanisms such as springs 450, as shown in FIG. 12A-FIG. 12C. In this case, when a platform starts to move up after the current layer (i.e. that forms part of the 3D object being printed) is cured, the top frame travels with the platform due to the bonding force between the current cured section and the tensioned film 330. Therefore, springs 450 coupled to the top frame 320 and the bottom frame 360 elongate and tend to recover their original states. Since the bottom frame 360 is typically secured (i.e. against the 3D printer), the force generated from the elongation of the springs aids in pulling back the top frame 320 towards bottom frame 360. Thus, this spring fastening mechanism is also a force-generating mechanism that facilitates the separation process. Accordingly, in exemplary embodiments, a reservoir assembly may comprise at least one force-generating mechanism, for example and without limiting the scope of the present invention, at least one spring coupled to a portion of a top frame and a portion of a bottom frame, configured to facilitate a separation process during three-dimensional printing.

In one embodiment, the bottom frame 360 and the top container can be integrated without any mechanical fastener. In this case, an actuator, such as a solenoid or linear stepper motor may be used to connect the bottom frame 360 and the top container. Since the exposure cycle is predetermined, the movement of the top container which is activated by the actuator can be synchronized with movement of the platform. When current layer is finished and the platform starts to move up, the top container travels towards the same direction but with a lower speed. By doing this, the separation force is mitigated because of the low relative speed between the top container and the platform. This also helps to alleviate the impact on the bonding between the attachment layer and the platform. When the current cured section is completely separated from the bottom of the top container, the top container goes back to its original position and waits for the next printing cycle.

The bottom frame 360 has a loop form defining a holding cavity 362 therewith in, wherein the rigid substrate 350 is supported within the holding cavity 362 of the bottom frame 360. The tensioning ring 340 is supported on the bottom frame 360 to cover the holding cavity 362. The gas outlet of the gas supplying module 390 is connected to the bottom frame 360 to supply the gas at the bottom side of the tensioned film 330.

In one embodiment, the reservoir assembly 300 further comprises one or more removable filters 380 that can be placed underneath the bottom container 360 of the reservoir assembly 300. Such removable filters 380 have predefined texture and thickness to control how much the image is being blurred to enhance the surface finish further. The removable filters 380 are developed for different types of applications. If an application requires less on details and more on the surface finish, a more textured filter may be used. If an application requires a moderate surface enhancement and a sharper image, a filter with less texture may be applied. Such enhancement could be obtained by having the removable filter 380 with various thicknesses. This will define how far the texture is being placed from the focal point of the light processing device, so it determines how much the image is being blurred and affecting the final surface enhancement.

A system 100 for three-dimensional printing, in accordance with exemplary embodiments of the present invention, may include: a computer 200 coupled to a light source 101 including instructions for selectively illuminating a photosensitive liquid in accordance with a geometric profile of a three-dimensional (3D) object, the light source for polymerizing the photosensitive liquid and forming a polymerized section of the 3D object; and a reservoir assembly 300 adapted to receive the light source 101, comprising: a top frame 320 having a cavity 322 with an aperture defined on a bottom edge of the top frame 320, the cavity 322 configured to be at least partially filled with the photosensitive liquid; a permeable tensioned film 330 stretchily coupled to the aperture so as to hold the photosensitive liquid within the cavity 322 of the top frame 320; a bottom frame 360 including a transparent or semi-transparent rigid substrate 350, the bottom frame 360 configured to register with the top frame 320; and a media layer 330a sandwiched between the permeable tensioned film 330 and the rigid substrate 350 of the bottom frame 360.

Figure 9:
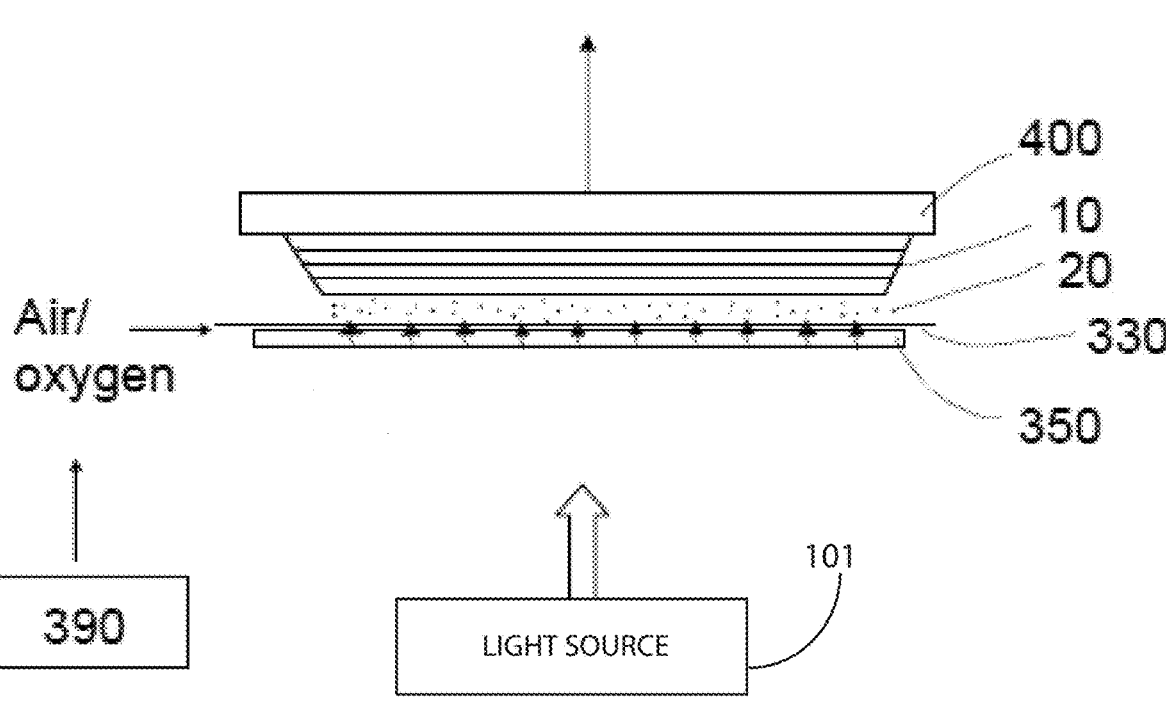
FIG. 9 illustrates an exemplary operation of a system according to an exemplary embodiment of the present invention.

FIG. 9 is a schematic view showing an exemplary operation of a system in accordance with the present invention. More specifically, FIG. 9 depicts system 100, including an elevator platform 400 that is partially submerged into a portion of top frame 320 of the reservoir assembly 300 and is located above the tensioned film 330. When light from light source 101 is projected from the bottom of the reservoir assembly 300, the light will transmit through the tensioned film 330 to the bottom side of the elevator platform 400. Then, the resin sandwiched between the elevator platform 400 and the tensioned film 330 is polymerized to form a cured layer of the 3D object, i.e., the polymerized section 10 thereof, at the bottom side of the elevator platform 400 above the tensioned film 330. At the same time, air or oxygen is introduced and is penetrated through the tensioned film 330 from the bottom side to the top side, so the resin at the top surface of the tensioned film 330 is not fully polymerized. Therefore, a thin layer of photosensitive resin 20 still remains as liquid between the newly cured layer of the 3D object (polymerized section 10) and the tensioned film 330 which will reduce the suction force for separating the cured layer of the 3D object from the tensioned film 330. Once the cured layer of the 3D object is formed at the bottom side of the elevator platform 400, the elevator platform 400 is elevated to uplift the cured layer of a 3D object. Since the elevator platform 400 is lifted, resin within the top frame 320 will fill into the gap between the newly cured layer (polymerized section 10) of the 3D object and the top side of the tensioned film 330. The liquid resin will then be polymerized via the light to form a subsequent cured layer under the current cured layer. In other words, the uplift force of the elevator platform 400 will not break the cured layers of the 3D object via the suction force during the operation. Therefore, the cured layers can be successively formed underneath the elevator platform 400 until the entire 3D object is finished.

The present invention further provides a method of building a 3D object via the reservoir assembly 300, wherein the method comprises the following steps.

(1) Dispose the tensioned film 330 (i.e., the air permeable film) at the bottom of the cavity 322 of the top frame 320 of the reservoir assembly 300. The tensioned film 330 is held at the bottom side of the top frame 320 via the holding rim 325.

(2) Fill the liquid resin in the cavity 322 of the top frame 320. It is worth mentioning that the tensioned film 330 prevents the liquid resin passing from the top side of the tensioned film 330 to the bottom side thereof. Also, heat is applied to heat the liquid resin in the cavity 322 of the top frame 320 via the heat transfer module 370.

(3) Project the light from the bottom of the reservoir assembly 300 via the light source 101 to polymerize the liquid resin above the tensioned film 330 in order to form a polymerized section 10 of the 3D object.

(4) During the polymerization, introduce the gas to the reservoir assembly 300 that the gas penetrates from the bottom side of the tensioned film 330 to the top side thereof to prevent a thin layer of 20 of the liquid resin above the tensioned film 330 from being fully polymerized for reducing the suction force of the polymerized section of the 3D object.

(5) Elevate the polymerized section 10 of the 3D object via an elevator platform 400. The liquid resin will fill into the gap between the polymerized section 10 of the 3D object and the tensioned film 330 for being polymerized.

(6) Repeat the steps (4) to (5) until the entire 3D object is completed.

The unique methods and features of the reservoir assembly 300 include but are not limited to the following:

First, the type of tensioned film 330 that may be used in accordance with the present invention—for example a STEM film—is simultaneously air permeable and elastic. The permeability creates a thin layer of photosensitive resin at the top surface of the tensioned film 330 which is not fully polymerized. This thin layer of liquid photosensitive resin helps to reduce the adhesion force between the cured section and the tensioned film 330. The elasticity creates the action of peeling to break the suction force.

Moreover, in exemplary embodiments as mentioned above, both surfaces of the tensioned film 330 are microtextured. The texture of the tensioned film 330 makes it so the tensioned film 330 appears non-optically transparent; but when the resin or photosensitive material comes in contact with the tensioned film 330, the tensioned film 330 becomes optically clear. Furthermore, the micro-texture helps minimizing the adhesion force because the micro-texturing creates micro-channels in which no resin resides, and therefore, an overall adhesion force is lower.

Yet another unique aspect of the invention includes components and methods that facilitate a type of anti-aliasing effect that may be desirable when printing 3D objects. By way of illustration, it is worth explaining that DLP Stereolithograpy, for example, works with pixels. Therefore, aliasing of the pixels is problematic for curved cross-sections, and affects the surface area. When the bottom surface of the tensioned film 330 is textured, the texturing blurs the boundaries of patterns in images, and creates an anti-aliasing effect by smoothing out edges of the 3D printed object being created.

Figure 10A:
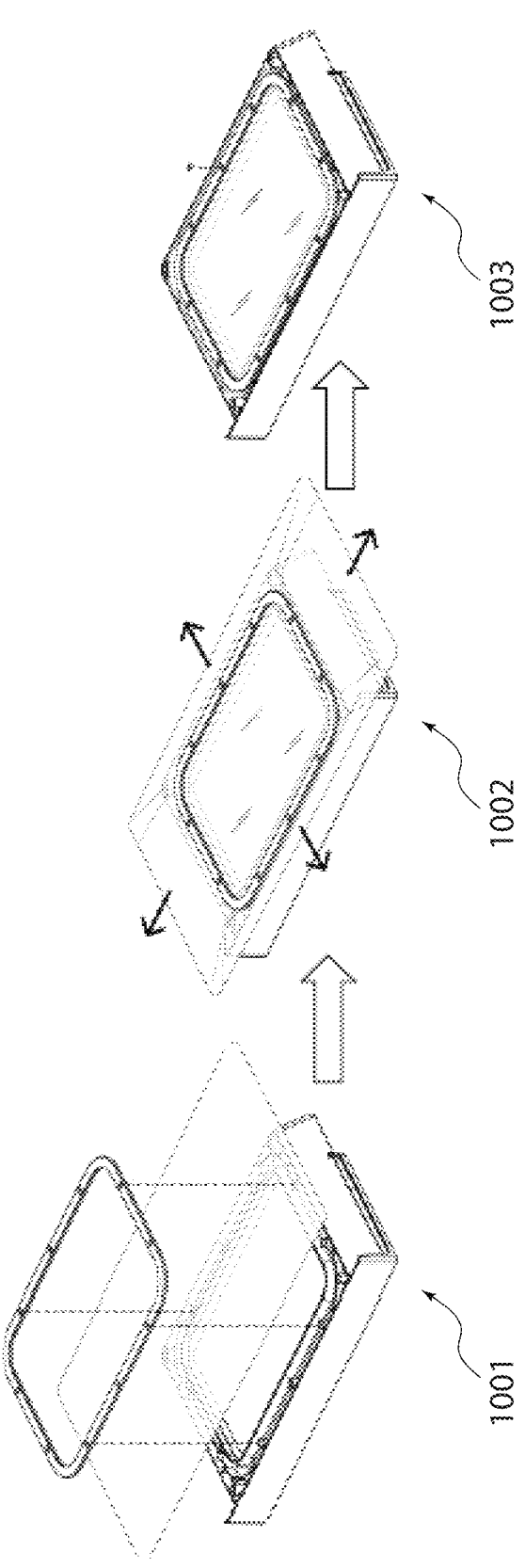
FIG. 10A-FIG. 10B illustrate two views that generally describe a process of assembling a reservoir assembly in accordance with exemplary embodiments of the present invention.
Figure 10B:
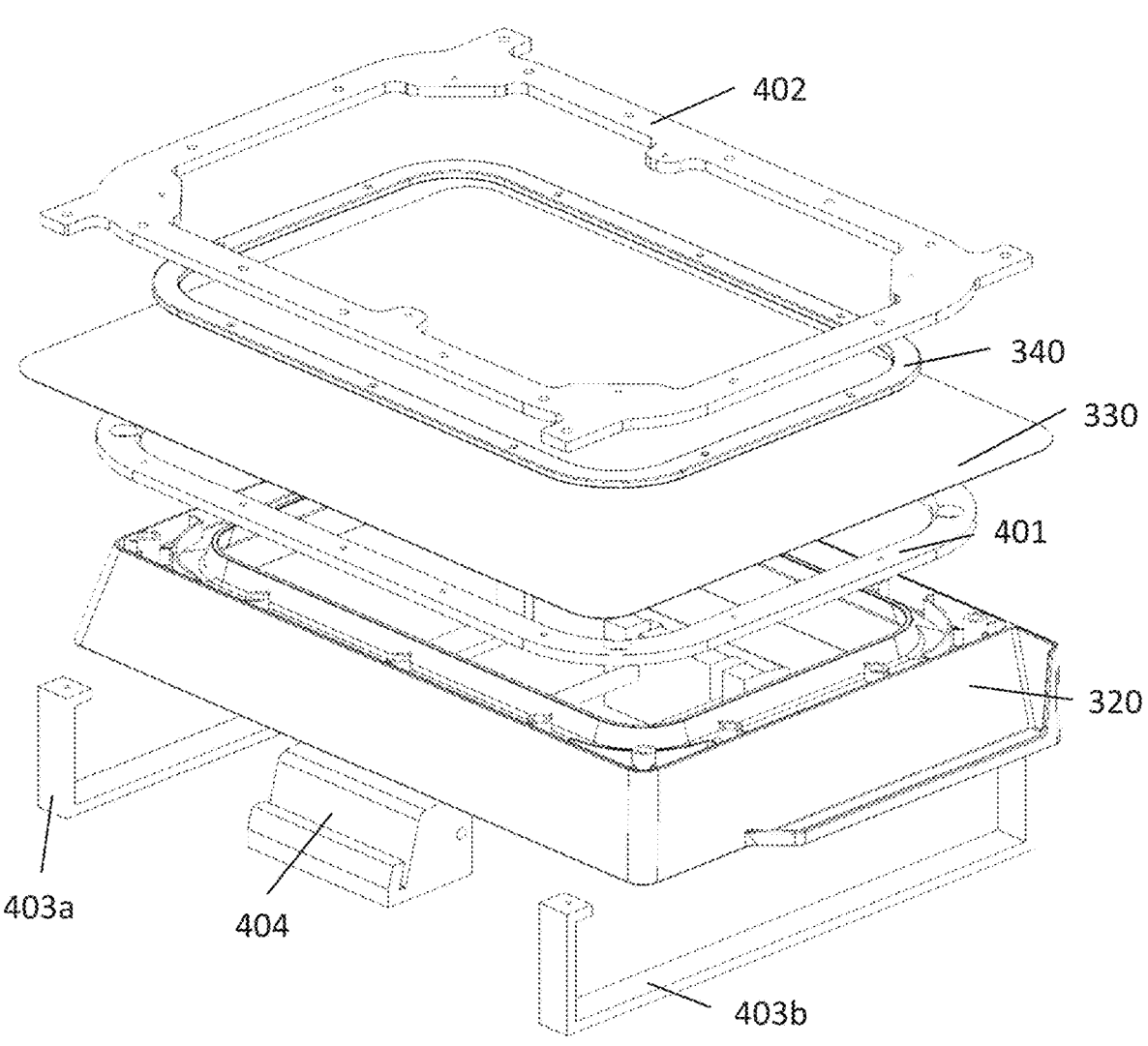
Figure 11A:
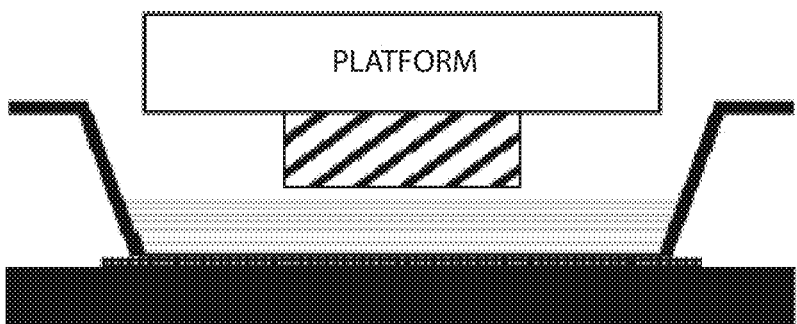
FIG. 11A-FIG. 11D illustrates a separation process with a media layer underneath a film according to the present invention.
Figure 11B:
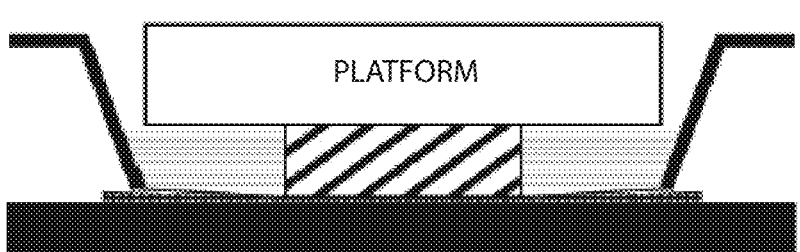
Figure 11C:
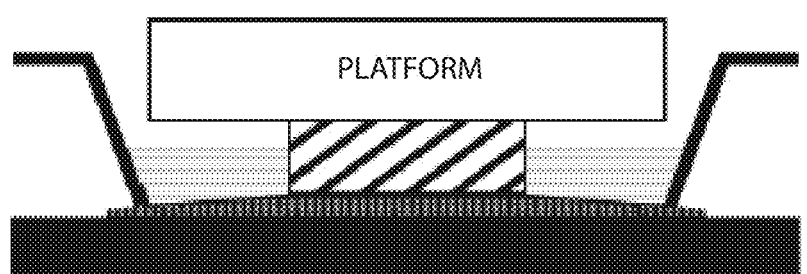
Figure 11D:
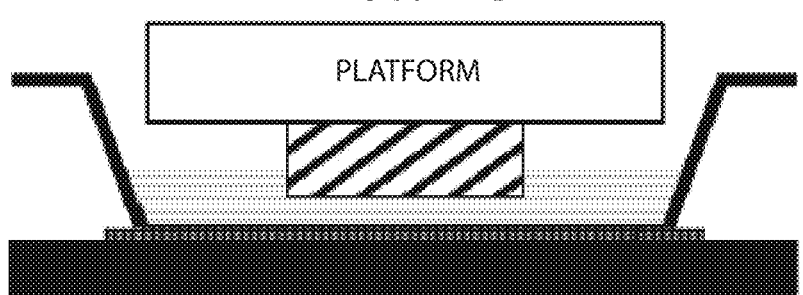

Now with reference to FIG. 10A-FIG. 10B, an exemplary tensioning method is described. That is, in order to obtain a consistent mechanical response at all locations on a tensioned film, it is desirable to tension the tensioned film uniformly. For example, turning first to FIG. 10A a general method 1000 for tensioning a film on a reservoir assembly in accordance with the present invention is shown. Although method 1000 is shown in a particular sequence of steps, other conceivable sequence of the steps may be practiced without deviating from the scope of the present invention.

In an exemplary embodiment, method 1000 comprises: step 1001 in which a top frame of a reservoir assembly may be flipped so that an aperture along a bottom portion of the top frame is exposed. In this step, a permeable tensioned film may be disposed over the aperture so as to cover a cavity of the top frame, wherein the cavity is configured to be at least partially filled with a photosensitive liquid. In exemplary embodiments, this step may be performed in a hot liquid bath or a hot air chamber so as to allow the film to expand when being stretched over the aperture of the bottom section of the top frame.

In step 1002, the film may be stretched so that the film may be stretchily coupled to the aperture in a manner to create a seal between the film and a portion of the top frame, so that the film will hold the photosensitive liquid within the cavity of the top frame, and the tensioned film may be suspended above a media layer disposed between the tensioned film and a transparent or semi-transparent rigid substrate of a bottom frame of the reservoir assembly (as discussed above). In this step, a tensioning component may be placed and briefly positioned on top of (i.e. a bottom surface of) the tensioned film prior to securing the tensioned film to the top frame. As mentioned with reference to step 1001, in exemplary embodiments, this step 1002 may also be performed in a hot liquid bath or a hot air chamber so as to allow the film to expand when being stretched and coupled over the aperture of the bottom section of the top frame.

In step 1003, the tensioned film may be secured to the top frame in a manner such that the tensioned film is stretchily coupled to the aperture to form a seal suitable for holding a photosensitive liquid within the cavity of the top frame. In some exemplary embodiments, the tensioned film may be wrapped around a portion of the top frame (as mentioned above) to achieve a suitable tension. In other exemplary embodiments, a high performance elastic double-sided adhesive may be implemented around a portion of the top frame in order to secure the tensioned film to top frame in a manner that seals the cavity and prevents any liquid material stored within top frame from spilling; in some exemplary embodiments, a high performance elastic double-sided adhesive tape such as the 3M™ VHB™ Tape 4952 may be employed; such component may be useful because the adhesive tape can replace mechanical fasteners or liquid adhesives and generally creates a permanent seal to keep the liquid material within the cavity.

In exemplary embodiments, a tensioning jig may be used. As shown specifically in FIG. 10B, a tensioning jig in accordance with the present invention may include four parts: a positioning ring 401, a press ring 402, two base bars 403*a* and 403*b*. During the pre-tensioning process, the positioning ring 401 is placed and positioned on the bottom side of the top frame 320, and then the tensioned film 330 (the STEM) is loosely placed on the bottom opening of the top frame 320 and the positioning ring 401 to cover the cavity 322. The tensioning ring 340 is placed and briefly positioned on the top of the STEM. Next, the press ring 402 is placed on the top of the STEM, and aligned with the positioning ring 401. At this step, the STEM has to be flat, however, no extra tensioning force is needed to tension the STEM. The positioning ring 401 and the press ring 402 are then coupled by fasteners, such as screws, and the press ring 402 and two base bars 403*a* and 403*b* which are placed at the top side of the top frame 320 are fastened through screws as well. Till now, the STEM, the positioning ring 401, and the top frame 320 are sandwiched between the press ring 402 and base bars 403*a* and 403*b*. In order to achieve a uniform tensioning for STEM, the top frame 320, the tensioning ring 340, the STEM, and together with the tensioning jig are placed in a hot medium, such as water or oil, with a constant temperature of 60~70° C. for 2 minutes to make sure the STEM is sufficiently heated up. Because of the heat the STEM has a tendency to expand, however, its border is fixed by the positioning ring 401 and the press ring 402. Therefore, the STEM may slightly warp towards the center. Next, by tightening six pressing screws, the pressing force exerted by the screws is uniformly transmitted to the STEM through the tensioning ring which is in direct contact with six pressing screws. Since the press ring 402 is coupled with the top frame 320, tightening six pressing screws will press down the tensioning ring together with the STEM. The displacement of the tensioning ring 340 results in a stretch on the STEM and makes it tensioned, and the warping of the STEM may disappear as well due to this stretch. Once the tensioning ring is pressed to its final position, fasteners, such as screws, are applied to the tensioning ring 340 to permanently fix the tensioning ring 340 and the STEM in position. After the tensioning ring 420 and STEM are fixed on the top frame 320, the tensioning jig can be removed from the top frame 320. All the aforementioned operations need to be finished in the hot medium with a constant temperature as described above. When the assembly of the top frame 320, tensioning ring 340, and the STEM is taken out of the hot medium, and cools down, the STEM has a tendency to shrink, however, as its border is secured in position by the tensioning ring, this tendency of shrinkage will lead to a tension in the STEM. It is noteworthy to mention that when tightening six pressing screws in the hot medium, the top frame 320 may deform due to both the thermal stress and the tightening force transmitted to the top frame 320. In this case, one or more clamps 404 can be applied to the top opening of the top frame 320. Because the clamp is rigid and has a fixed span which matches the dimension of the top frame 320, it will hold the top frame 320 in position and prevent it from being deformed.

Turning to the next figures, another embodiment is presented. More specifically, FIG. 13A is a diagram showing an exemplary cross-section of a top frame coupled to a portion of a bottom frame of a reservoir assembly according to an exemplary embodiment of the present invention, and FIG. 13B illustrates an exemplary permeable substrate, which may be any type of substrate that is permeable or semi-permeable, such as a porous substrate or material in the form of a thin flexible sheet, or an interlaced structure such as a mesh or a flexible mesh that may be used, in some exemplary embodiments of the present invention, to reduce a separation force during a three-dimensional printing process.

Figure 13A:
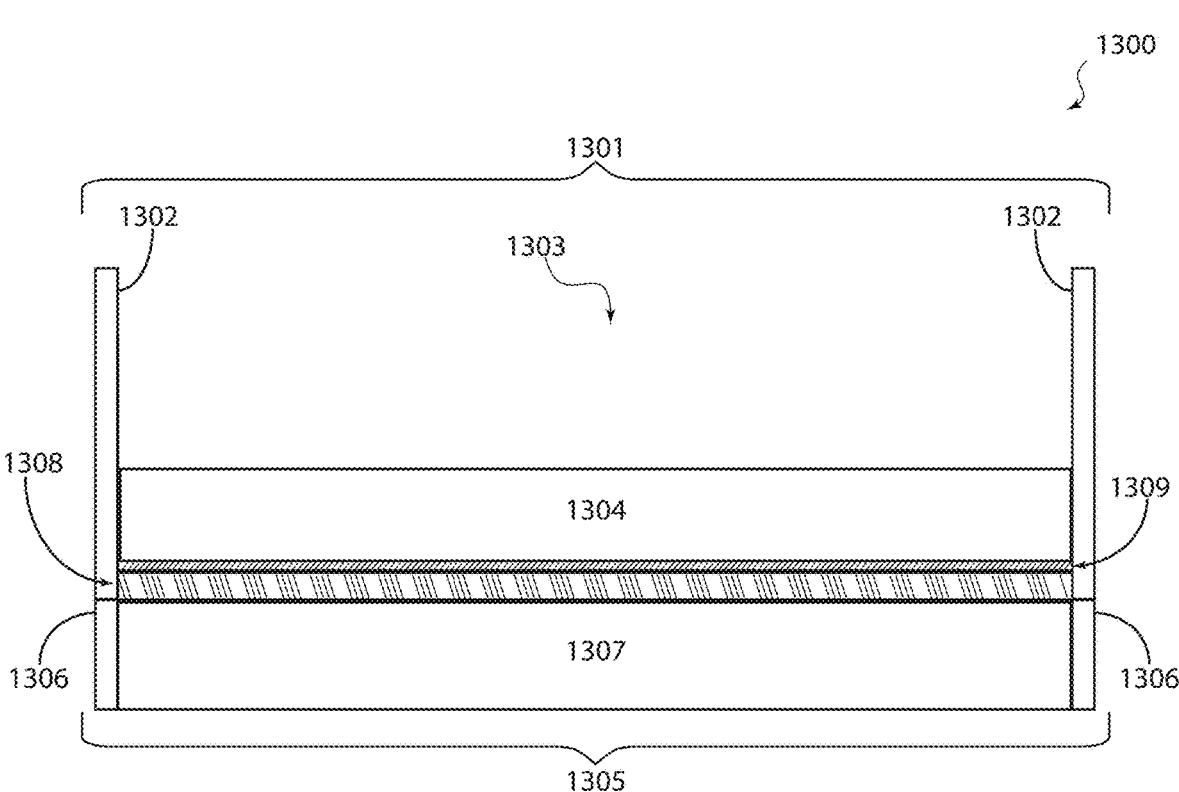
FIG. 13A is a diagram showing an exemplary cross-section of a top frame coupled to a portion of a bottom frame of a reservoir assembly according to an exemplary embodiment of the present invention.
Figure 13B:
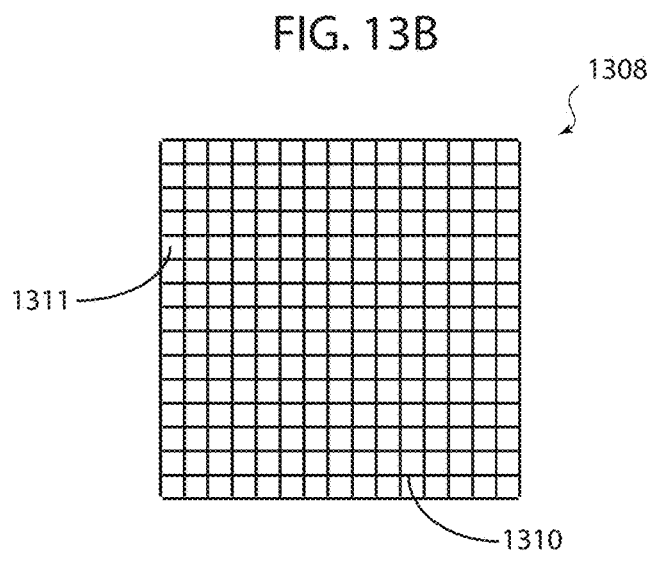
FIG. 13B illustrates an exemplary permeable substrate that may be used in some exemplary embodiments of the present invention, to reduce a separation force during a three-dimensional printing process.

In the embodiment of FIG. 13A, reservoir assembly 1300 for use in three-dimensional printing, may include a top frame 1301 including side walls 1302, which in part form a cavity 1303 configured to be at least partially filled with a photosensitive liquid. The top frame 1301 includes an aperture defined on a bottom edge of the top frame 1301 between the side walls 1302. The aperture is sealed off with a film 1304 (that may a permeable film) stretchily coupled to the side walls 1302 and or to any other portion of or component of top frame 1301 in a manner so as to cover the aperture and thus adapted to hold the photosensitive liquid within the cavity 1303 of the top frame 1301. A bottom frame 1305 including side walls 1306 enclose a transparent or semi-transparent rigid substrate 1307, the bottom frame 1305 is configured to register with the top frame 1301. To significantly reduce a separation force during a three-dimensional printing process, a media layer such as a macro breathable membrane, including but not limited to a permeable substrate 1308, may be sandwiched between the top frame 1301 and the bottom frame 1305, and more specifically, sandwiched between the permeable film 1304 supported by top frame 1301 and the rigid substrate 1307 supported by bottom frame 1305.

In exemplary embodiments, as shown in FIG. 13A, the bottom surface of film 1304 may include a textured or micro-textured surface 1309. In some exemplary embodiments, film 1304 may comprise a Polymethylpentene (PMP)

film; for example, and without limiting the scope of the present invention a TPX® Polymethylpentene film from Mitsui Chemicals™ may be used. In some exemplary embodiments, film 1304 includes desirable permeability properties and includes hydrophobic properties. Generally, film 1304 is translucent microtextured so it looks non-transparent, however when film 1304 comes in contact with liquid, it becomes transparent. The invention is not limited to PMP films however, and other materials may be used for film 1304 including but not limited to PTFE and or PET. In exemplary embodiments, film 1304 may be greatly tensioned for maximum hydrophobic and dimensional accuracy purposes.

In some embodiments, the transparent or semi-transparent rigid substrate 1307 comprises a glass substrate. In some embodiments, the transparent or semi-transparent rigid substrate 1307 comprises a chemically treated surface. In some embodiments, the transparent or semi-transparent rigid substrate 1307 comprises a glass surface that has been chemically treated to create a microstructure with similar properties as the macro breathable membrane in that several channels or cavities are formed therein to allow air to travel through the permeable membrane and further decrease the separation forces during a three-dimensional printing process. In some embodiments, the transparent or semi-transparent rigid substrate 1307 comprises glass, and a microstructure with several channels or cavities therein is formed by sandblasting the glass. In some embodiments, the transparent or semi-transparent rigid substrate 1307 is treated with a coating including a mixture of an aggregate and glue-like polymer. In some exemplary embodiments, the transparent or semi-transparent rigid substrate 1307 comprises projection lens of a stereolithography projector. For example, and without limiting the scope of the present invention, in one exemplary embodiment, the transparent or semi-transparent rigid substrate 1307 may be an LCD projection lens of an LCD-based stereolithography projector. In one exemplary embodiment, the transparent or semi-transparent rigid substrate 1307 may be a DLP projection lens projection lens of a DLP-based stereolithography projector. In some exemplary embodiments, the transparent or semi-transparent rigid substrate 1307 may be a LCOS projection lens of an LCOS-based stereolithography projector.

FIG. 13B illustrates an exemplary permeable substrate, and more specifically, an exemplary embodiment of permeable substrate 1308. Generally, permeable substrate 1308 provides a macro breathable membrane. In some exemplary embodiments, permeable substrate 1308 comprises of woven nylon strands that create an exceptionally fine mesh. In some exemplary embodiments, permeable substrate 1308 comprises a thin or ultra-thin paper mesh, for example a paper substrate made by Hidaka Washi. Different sizes and variations may be employed without deviating from the scope of the present invention. For example, and without limiting the scope of the present invention, permeable substrate 1308 may comprise of strands 1310 that have micro openings 1311. In some exemplary embodiments, each of the plurality of micro openings of the permeable substrate is between 85 to 95 microns. In some exemplary embodiments, a mesh size of the permeable substrate 1308 is between 80 to 200. In some exemplary embodiments, permeable substrate 1308 may comprise a mesh size of 198×198 wherein the strands 1310 are configured to form micro opening 1311 having an opening size of approximately 0.0035" or 88.9 microns. In some embodiments, an ultra-thin paper material with a thickness less than 30 um and a weight density from 2 g/m2 to 34 g/m2 may be used as a flexible paper mesh.

As may be appreciated by a person of ordinary skill in the art, the many openings 1311 will have a total open area through which air may pass through the permeable substrate. In some exemplary embodiments, the total open area may be between 40% and 55%. In some exemplary embodiments, this open area comprises of approximately 49% of the total area. In some exemplary embodiments, the total open area may be between 80% and 90%, for example when a very thin paper or paper-like material is used. In exemplary embodiments, the diameter of strands 1310 may be approximately 0.0015" or 38.1 microns. Typically, permeable substrate 1308 is a macro breathable membrane so that it looks opaque but when it comes in contact with light, it passes over 90% of light through. Generally, using permeable substrate 1308 as a proxy layer between the permeable film 1304 supported by the top frame 1301 and the rigid substrate 1307 supported by the bottom frame 1305 leads to a 5%-10% reduction of suction forces during the polymerization, thus making the printing process much more efficient. In some exemplary embodiments, suction forces were reduced to 1/8$^{th}$ of the force used without the permeable substrate 1308. Implementation of permeable substrate 1308 may be achieved in any number of ways without deviating from the scope of the present invention. For example, and without limiting the scope of the present invention, in some embodiments, permeable substrate 1308 may be glued to at least a portion of the bottom or top frames. In some embodiments, permeable substrate 1308 may secured to at least a portion of the transparent or semi-transparent rigid substrate 1307. In some embodiments, permeable substrate 1308 may secured to at least a portion of the permeable film 1304. In some embodiments, permeable substrate 1308 may be simply cut to size of the aperture between walls 1302 of top frame 1301 and placed between the permeable film 1304 and the transparent or semi-transparent rigid substrate 1307 such that the permeable substrate 1308 is sandwiched between the permeable film 1304 and the transparent or semi-transparent rigid substrate 1307.

Reservoir assembly 1300 may be compatible with all the other components discussed above. For example, and without limiting the scope of the present invention, reservoir assembly 1300 may include a deep portion of the cavity configured to collect the photosensitive liquid. In some exemplary embodiments of reservoir assembly 1300, the permeable film includes polymethylpentene. In some exemplary embodiments of reservoir assembly 1300, reservoir assembly 1300 further comprises at least one visual indicator situated on a surface of a peripheral shallow portion of the top frame. In some exemplary embodiments of reservoir assembly 1300, reservoir assembly 1300 further comprises a force-generating mechanism coupled between the top frame and the bottom frame configured to facilitate a separation process during three-dimensional printing. These any various of the features, structures, and or elements that were described in other embodiments may be employed by reservoir assembly 1300 without deviating from or limiting the scope of the present invention.

Figure 14:
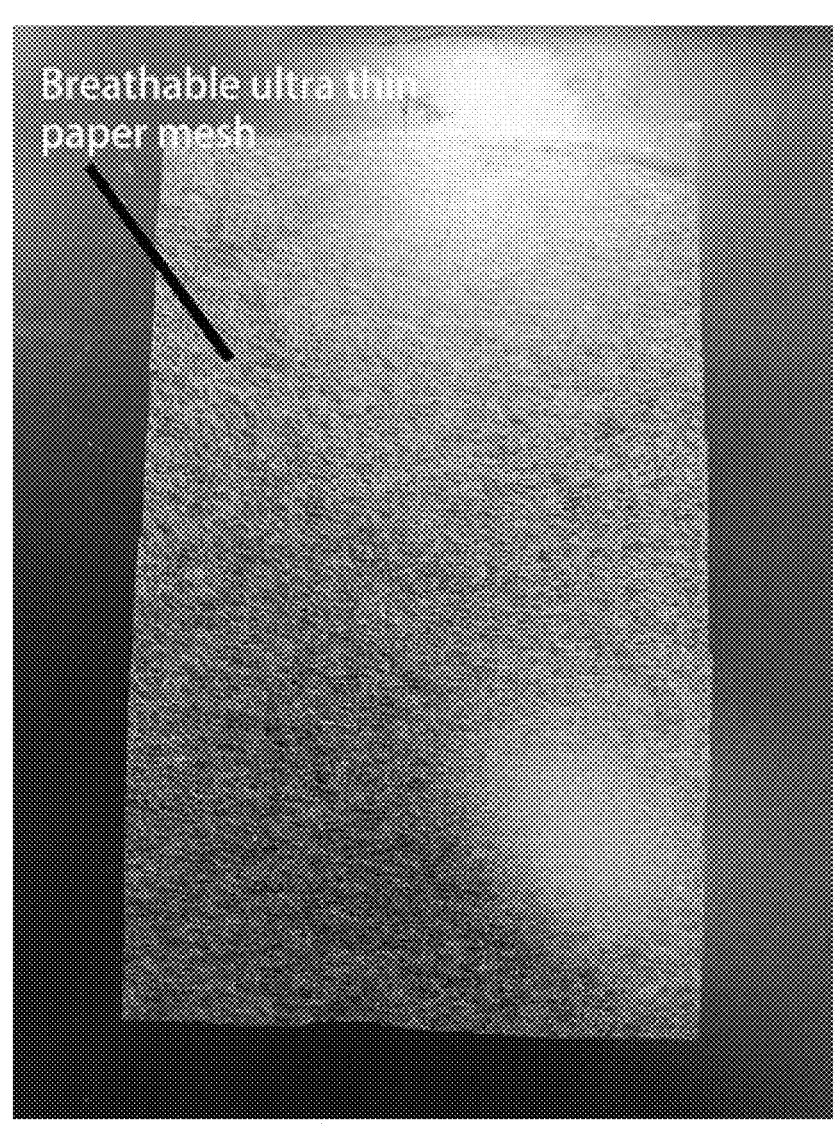
FIG. 14-FIG. 15 illustrate an exemplary permeable substrate and exemplary configuration in accordance with some exemplary embodiments of the present invention.
Figure 15:
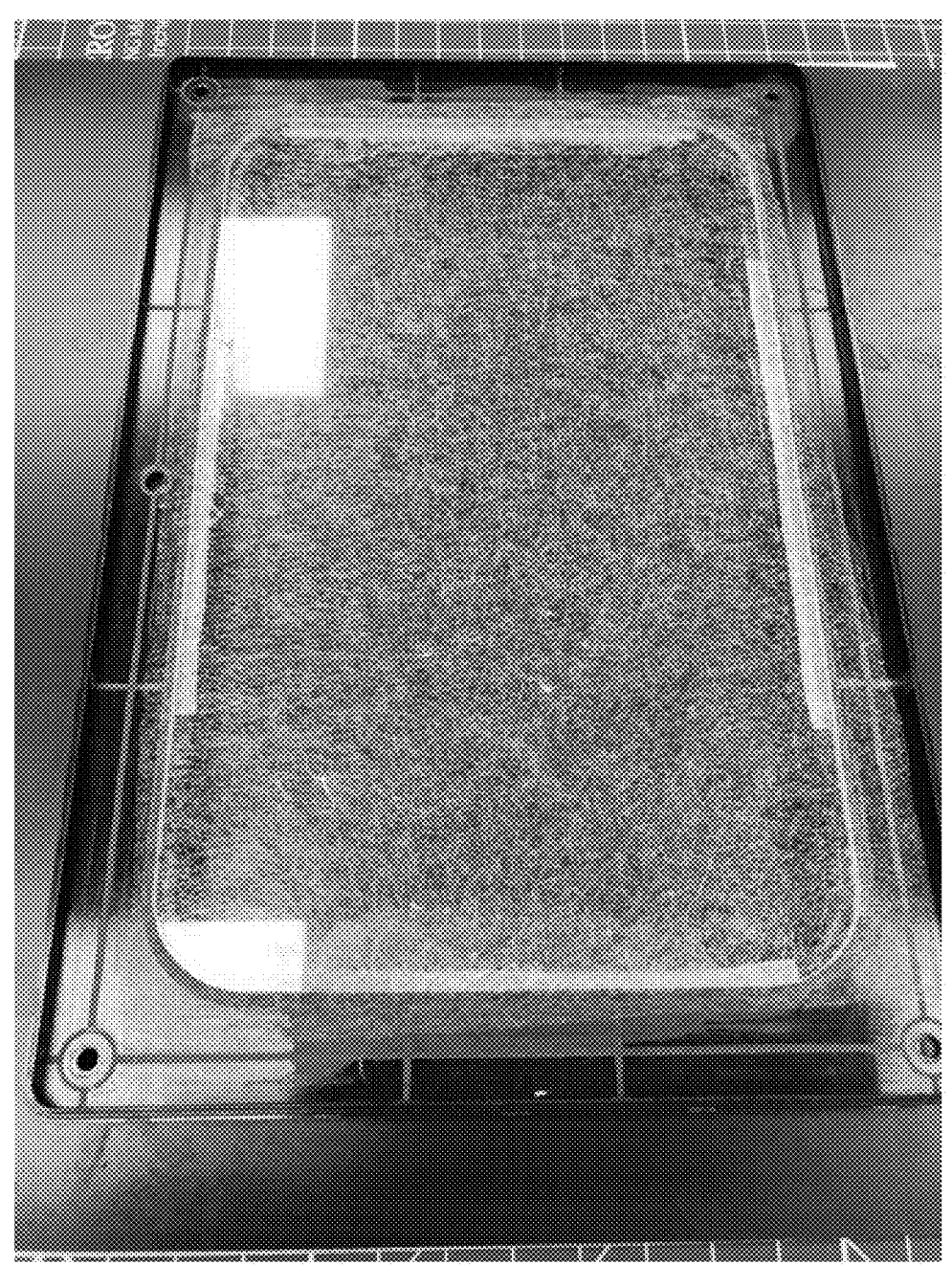

FIG. 14-FIG. 15 illustrate an exemplary permeable substrate and exemplary configuration in accordance with some exemplary embodiments of the present invention. More specifically, in the shown exemplary embodiment, a paper mesh may be used, which is constructed of a thin or ultrathin paper or paper substrate. For example, and without limiting the scope of the present invention, the an ultra thin paper mesh called Tengu from Hidaka Washi may be used. Regardless of the type or brand of paper material used, the ultra-thin paper mesh should create include a plurality of channels or channel-like structure (or otherwise microstructure) for air to breath in and out freely, during the polymerization and separation process. The microstructure allows a superior low suction force. In exemplary embodiments, the paper mesh is both transparent and flexible, with a thickness less than 30 um and a weight density from 2 g/m2 to 34 g/m2.

Figure 16:
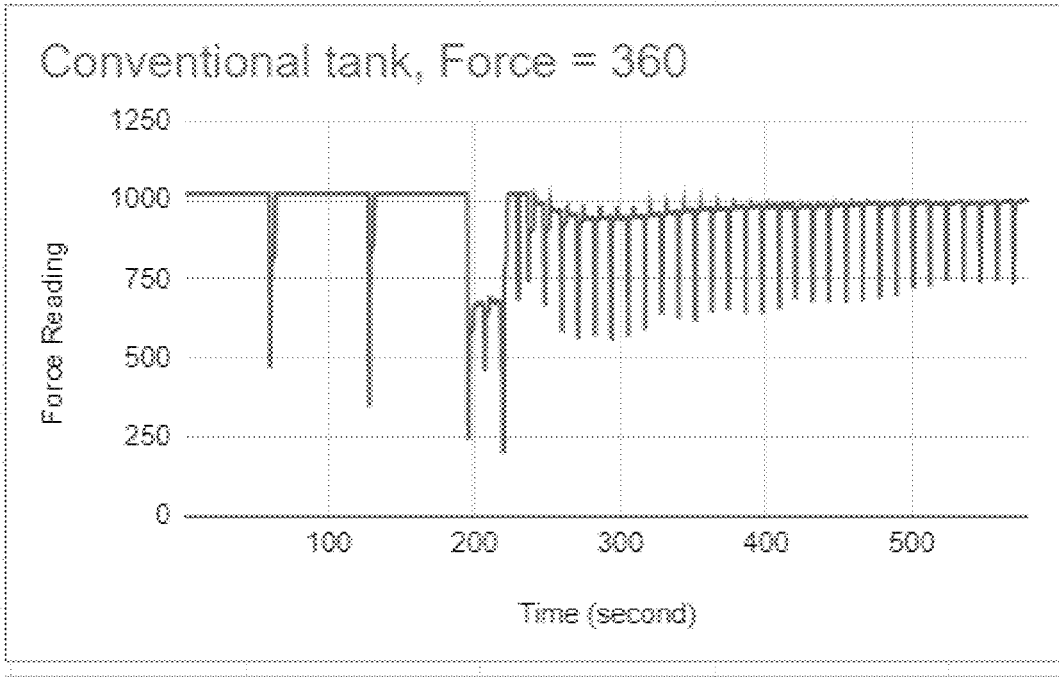
FIG. 16 depicts charts with experimental data indicating reduction of separation force achieved with some exemplary embodiments of the present invention.
Figure 16:
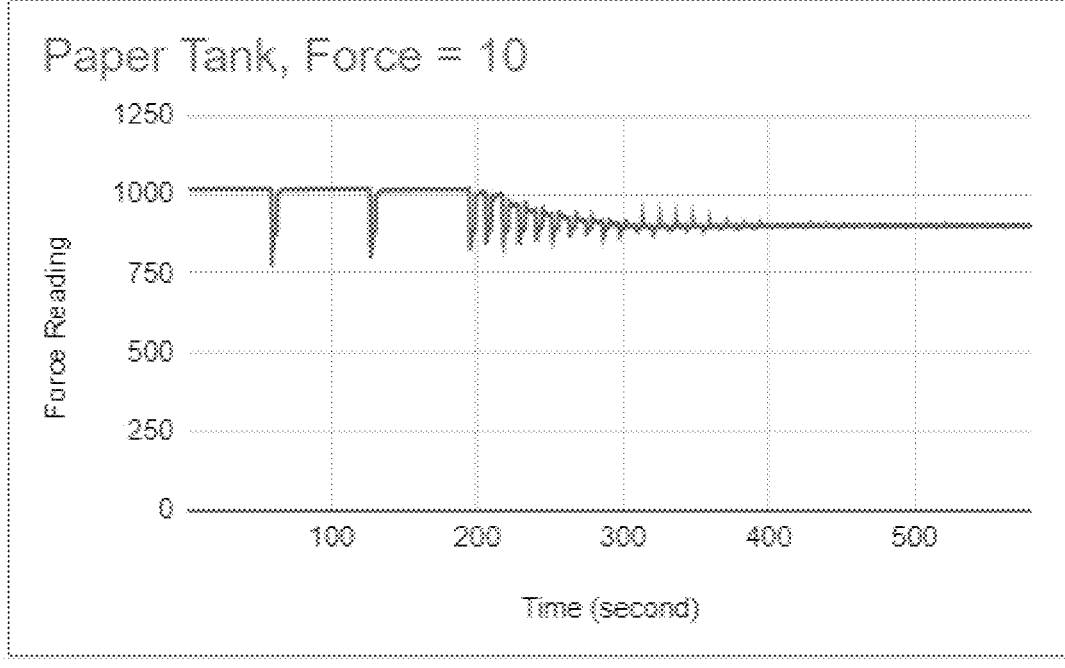

FIG. 16 depicts charts with experimental data indicating reduction of separation force achieved with some exemplary embodiments of the present invention. As may be appreciated from the data, the forces generated in a system using the ultra-thin paper mesh are significantly lower than the forces in a conventional system.

Figure 17:
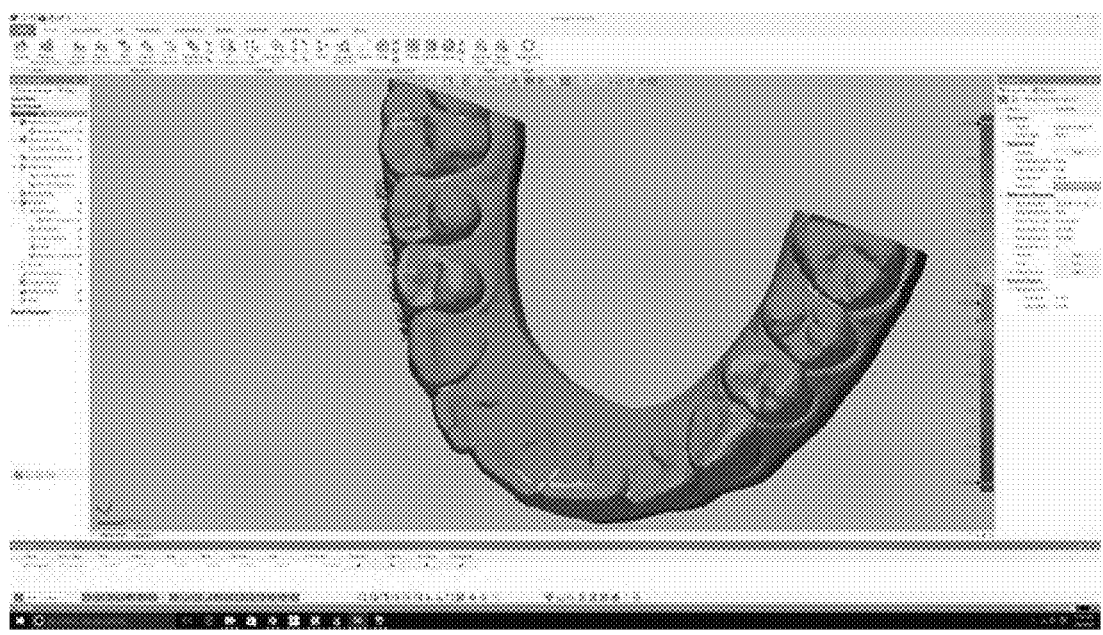
FIG. 17 depicts screen outputs with accuracy data comparing conventional systems with some exemplary embodiments of the present invention.
Figure 17:
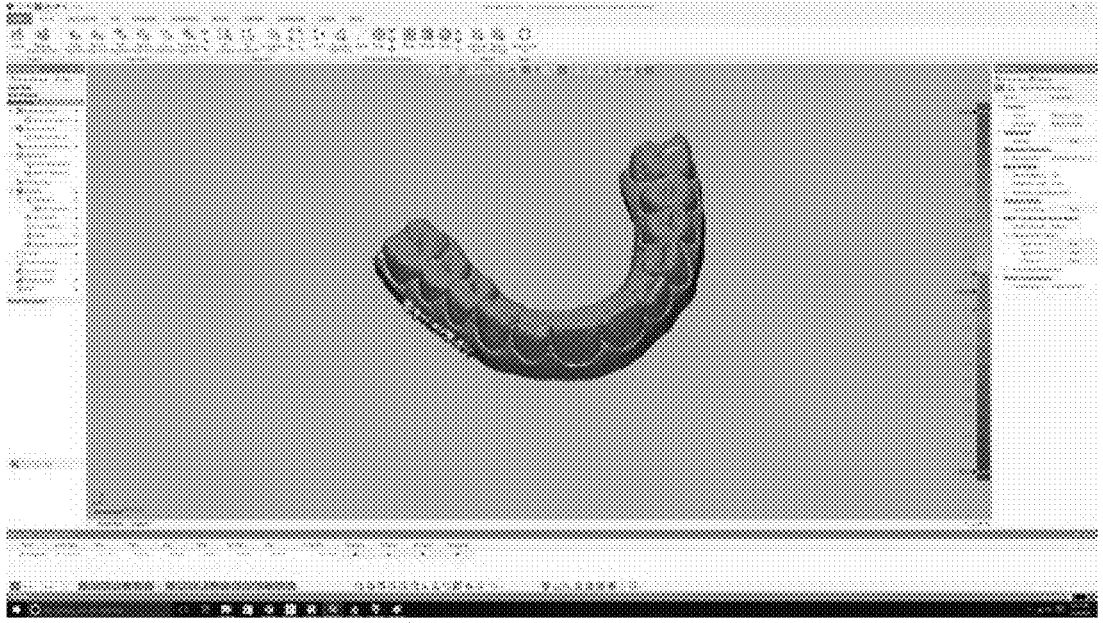

FIG. 17 depicts screen outputs with accuracy data comparing conventional systems with some exemplary embodiments of the present invention. As may be gleaned from the images, a conventional system (the image on top) yielded accuracy of 94%, while a system that employs a paper mesh as described in this disclosure, yields an increased accuracy of 96.4%.

Figure 18:
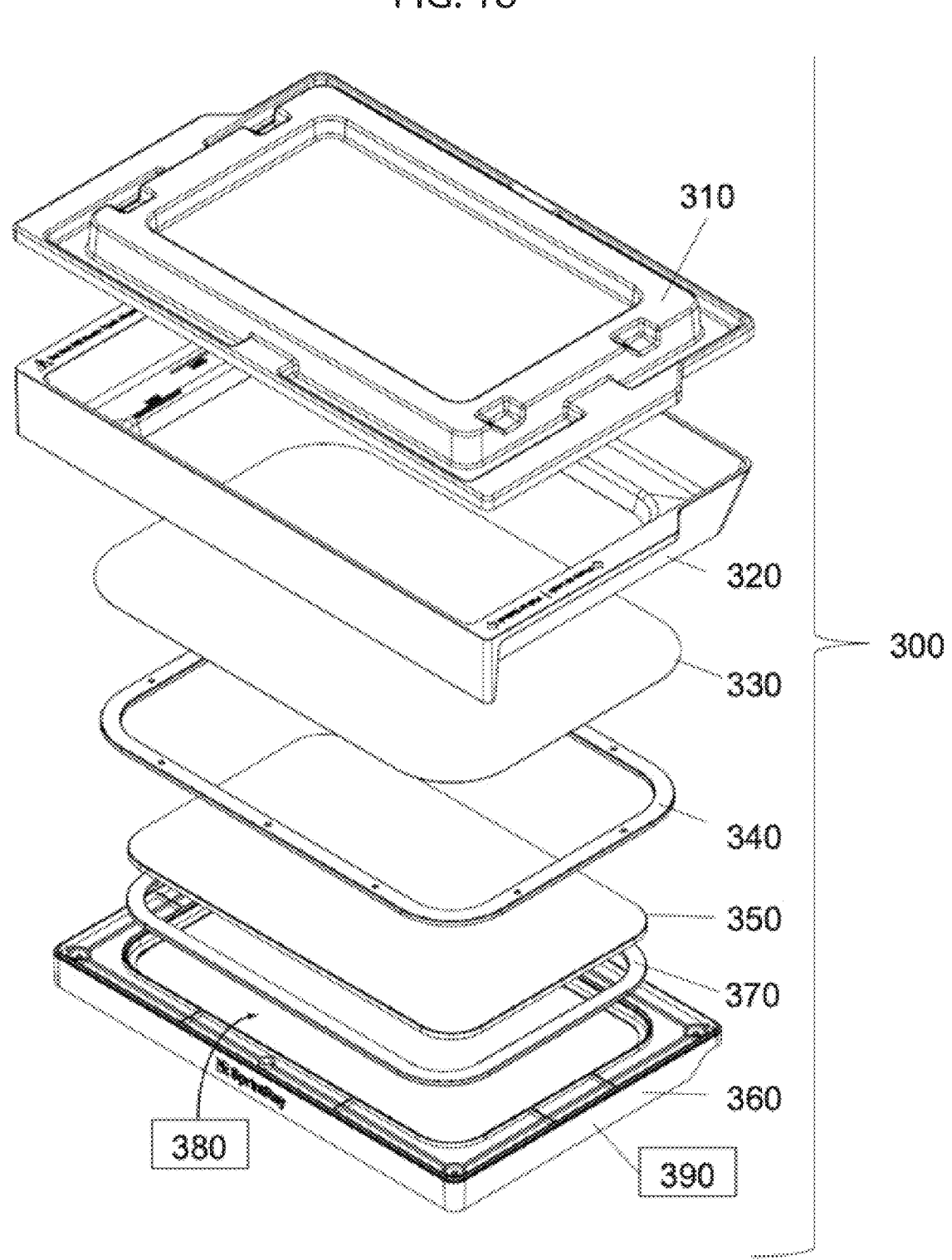
FIG. 18 illustrates an exploded perspective view of a reservoir assembly of an exemplary system according to the present invention, in which a surface is treated in order to achieve an improved reduction of the separation force.

FIG. 18 illustrates an exploded perspective view of a reservoir assembly of an exemplary system according to the present invention, in which a surface is treated in order to achieve an improved reduction of the separation force. More specifically, this exploded view shows a reservoir in which a microstructure is formed on either a rigid substrate or the permeable film itself by sandblasting a surface thereof.

Since the principle of separation is by creating air channels between the film and the rigid transparent bottom, instead of using a third layer such as the mesh or the ultra thin paper mentioned above, another embodiment is to use the sandblasting process to create the texture directly on the permeable membranes, or the optical clear glass or plastics. In FIG. 18, 330 is the permeable membranes and 350 is the optical clear glass or plastics. The sandblasting process creates channels on the surface of a material, these channels form airways that allow air to freely flow through. It's crucial to have free air during the 3D printing layer separation process. Without the free air flow through the membranes and optical clear glass or plastics, the vacuum will be formed and results in huge suction force during separation. While the airways created after the sandblasting process, allows a fully contact between membranes and optical clear glass or plastics, which leads to great accuracy results. And the same time, it prevents the vacuum from forming during separation.

In some embodiments, a system for three-dimensional printing, may include: a computer coupled to a light source including instructions for selectively illuminating a photosensitive liquid in accordance with a geometric profile of a three-dimensional (3D) object, the light source for polymerizing the photosensitive liquid and forming a polymerized section of the 3D object; and reservoir assembly adapted to receive the light source, comprising: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame.

In some embodiments, either the transparent or semi-transparent rigid substrate and or the permeable film, or both, are treated to create a microstructure with multiple air channels. In some exemplary embodiments, the transparent or semi-transparent rigid substrate comprises a glass surface that has been chemically treated to create the microstructure formed therein to allow air to travel through the permeable film and further decrease the separation forces during a three-dimensional printing process. In some exemplary embodiments, the transparent or semi-transparent rigid substrate comprises a glass surface that has been sandblasted to create the microstructure.

Figure 19:
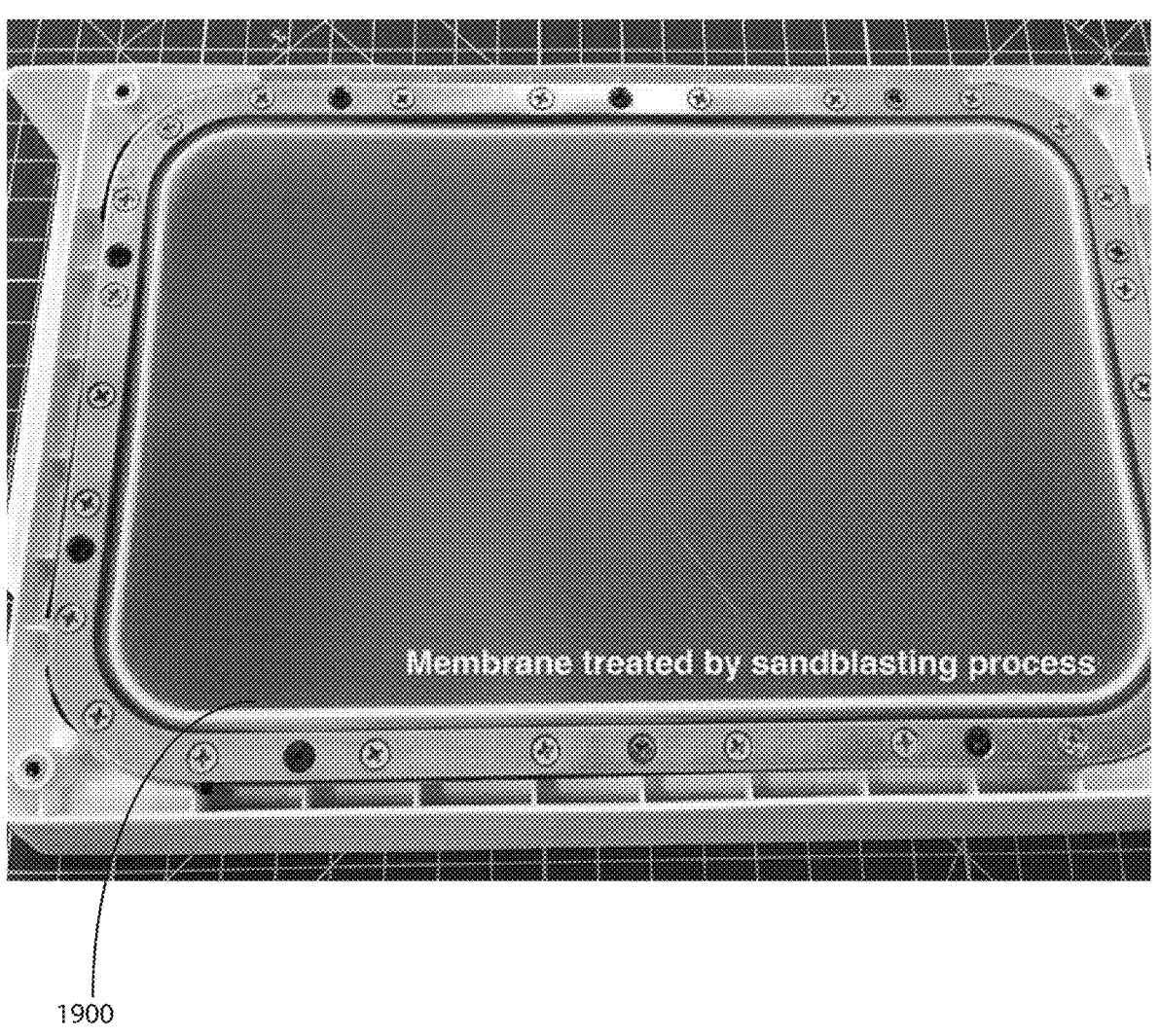
FIG. 19 illustrates an exemplary permeable membrane treated in order to achieve an improved reduction of the separation force, in accordance with some exemplary embodiments of the present invention.
Figure 20:
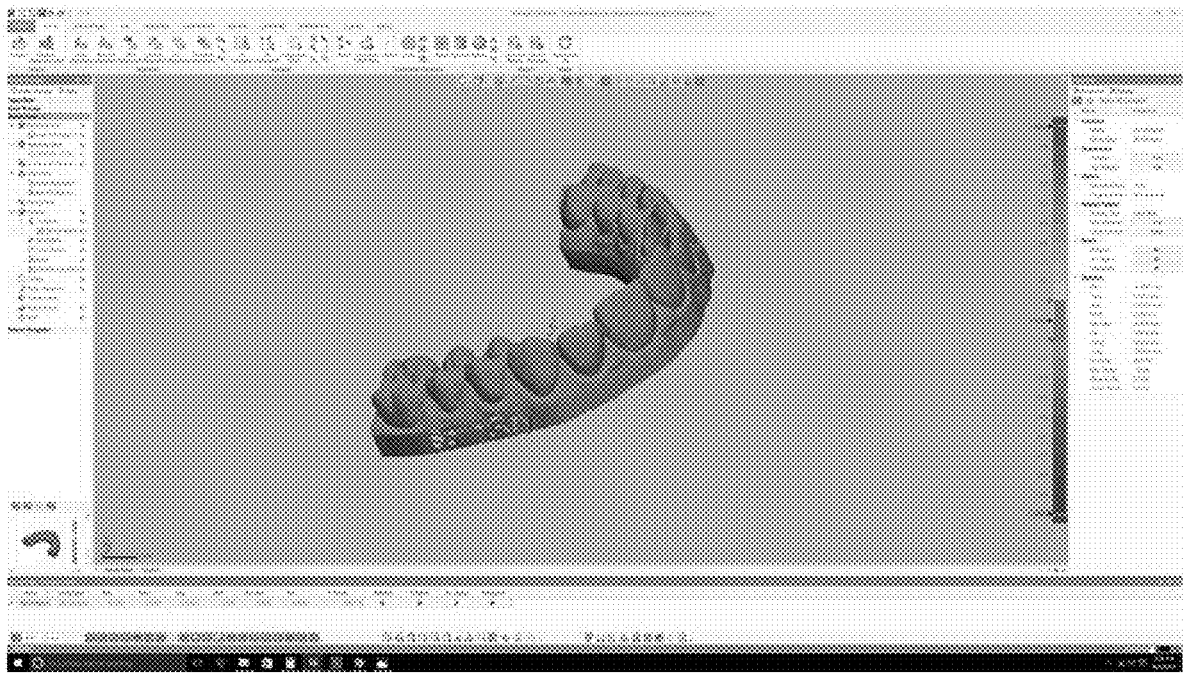
FIG. 20 depicts a chart and screen output with experimental data indicating accuracy and reduction of separation force achieved with some exemplary embodiments of the present invention.
Figure 20:
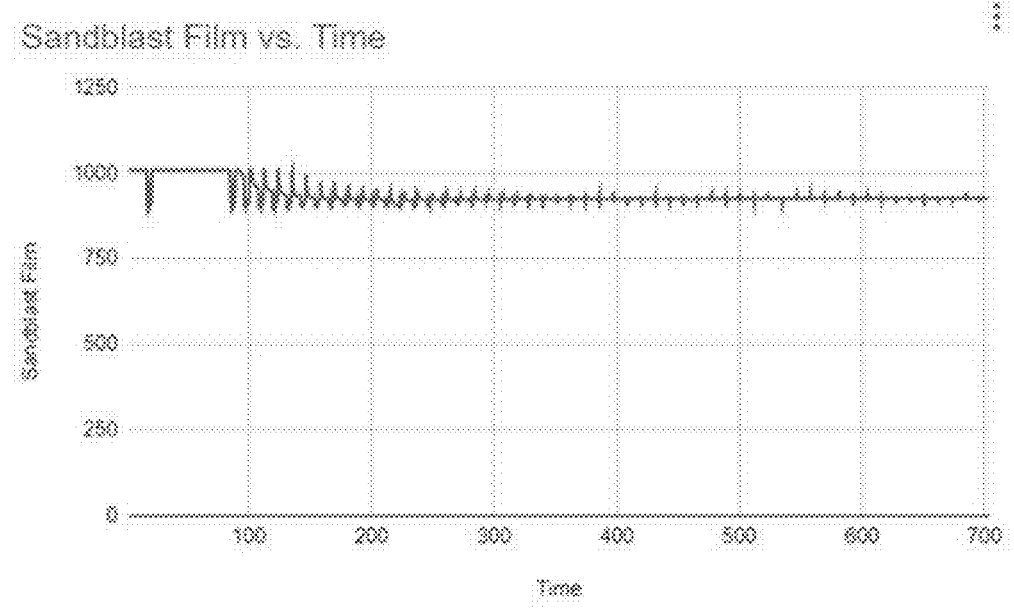

FIG. 19 illustrates an exemplary permeable membrane treated by sandblasting in order to achieve an improved reduction of the separation force, in accordance with some exemplary embodiments of the present invention. FIG. 20 depicts a chart and screen output with experimental data indicating accuracy and reduction of separation force achieved with some exemplary embodiments of the present invention. As may be gleaned from the images, a system that employs treated permeable membrane (via sandblasting) as described in this disclosure, yields an increased accuracy of 98.1% within 100 um tolerances. Similarly, forces are significantly reduced such that they are $1/20^{th}$ those of conventional means.

Figure 21:
FIG. 21 illustrates an exemplary transparent or semi-transparent substrate treated in order to achieve an improved reduction of the separation force, in accordance with some exemplary embodiments of the present invention.
Figure 22:
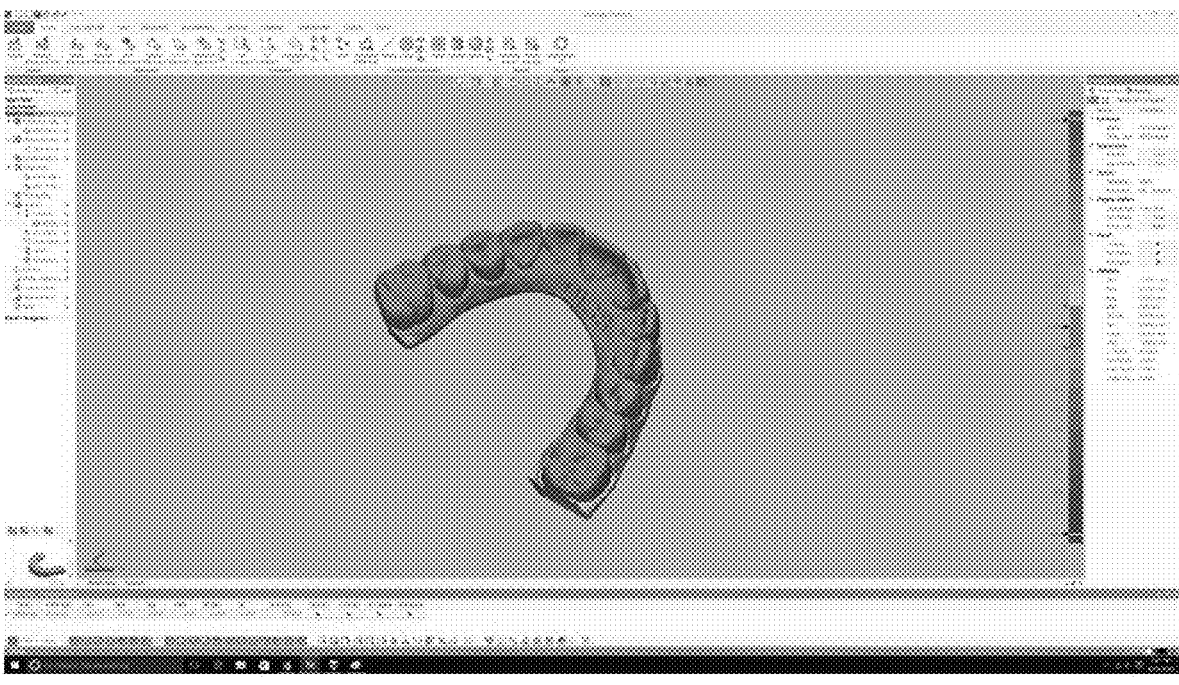
FIG. 22 depicts a chart and screen output with experimental data indicating accuracy and reduction of separation force achieved with some exemplary embodiments of the present invention.
Figure 22:
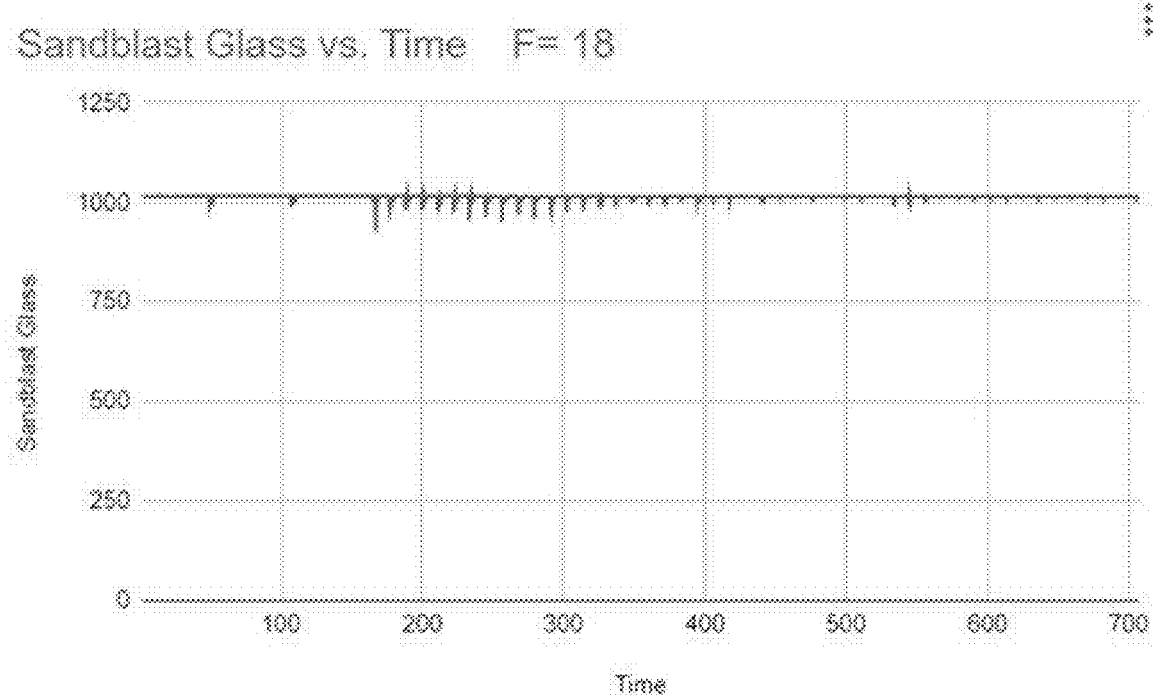

FIG. 21 illustrates an exemplary transparent or semi-transparent substrate treated by sandblasting in order to achieve an improved reduction of the separation force, in accordance with some exemplary embodiments of the present invention. FIG. 22 depicts a chart and screen output with experimental data indicating accuracy and reduction of separation force achieved with some exemplary embodiments of the present invention. As may be gleaned from the images, a system that employs treated rigid substrate (via sandblasting) as described in this disclosure, yields an increased accuracy of 98.1% within 100 um tolerances. Similarly, forces are significantly reduced (F=16 v. F=360) from those of conventional means.

Figure 23:
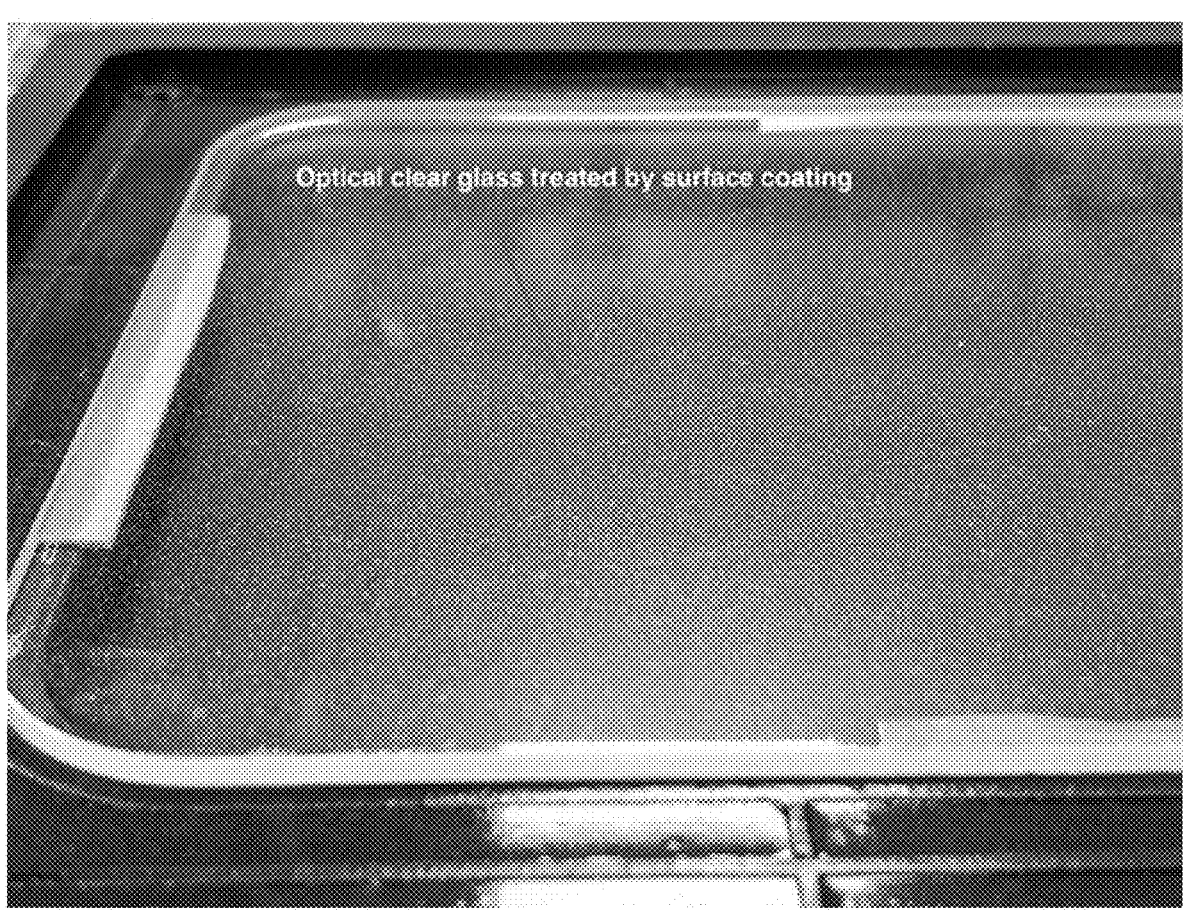
FIG. 23 illustrates an exemplary treatment of surface in order to achieve an improved reduction of the separation force, in accordance with some exemplary embodiments of the present invention.

FIG. 23 depicts a surface that has been treated in order to achieve an improved reduction of the separation force, in accordance with some exemplary embodiments of the present invention. In some embodiments, surface 1900 includes a coating to create airways on the surface 1900. This may be achieved by using a mixture of ultra-fine particles, for example and without limitation, micro level resin fillers and resin, to evenly spray on the surface. In some embodiments, the particles may include resin particles such as polyurethane, glass powder, and or ceramics such as alumina, zirconia, or any other similar materials. In exemplary embodiments, the particles are sized 20-200 microns. In some exemplary embodiments, surface 1900 is a glass surface that is sprayed with a substance including particles having 20-200 microns particle size in a mixture of polyurethane and glass powder or ceramics such as alumina, zirconia, or any other similar materials. In some exemplary embodiments, surface 1900 is a film, such as a clear film surface, that is sprayed with a substance including particles having 20-200 microns particle size in a mixture of polyurethane and glass powder or ceramics such as alumina, zirconia, or any other similar materials. In yet other exemplary embodiments, two permeable films may be sprayed with a substance including particles as described above, and sandwiched to form a substrate with airways. In yet other embodiments, the same may be achieved on an optical clear glass or plastic surface. In some embodiments, the resin fillers can be applied directly on the surface loosely. This will create a coating on the surface, and the micro filler on the surface will create airways to let air freely flow through during separation process. In some exemplary embodiments, the material including the small particles comprises Miapoxy 65, which as may be appreciated from the image shown create fine white particles on the surface 1900, which supports the airways between the film and glass.

Figure 24:
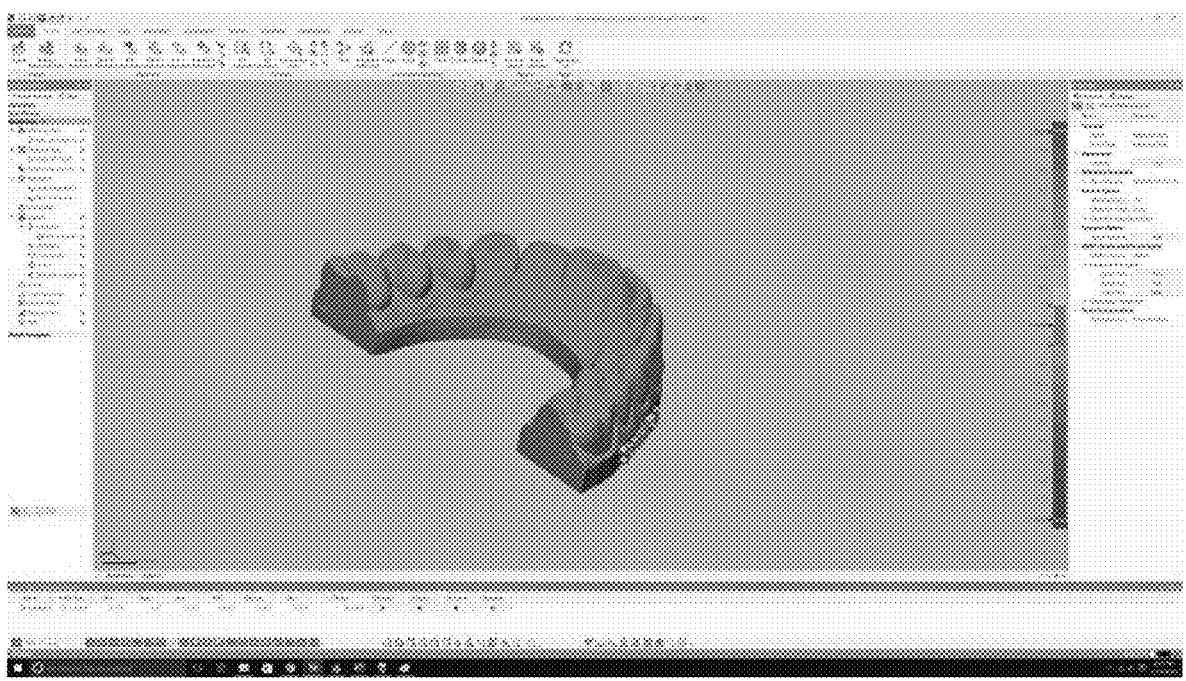
FIG. 24 depicts a chart and screen output with experimental data indicating accuracy and reduction of separation force achieved with some exemplary embodiments of the present invention.
Figure 24:
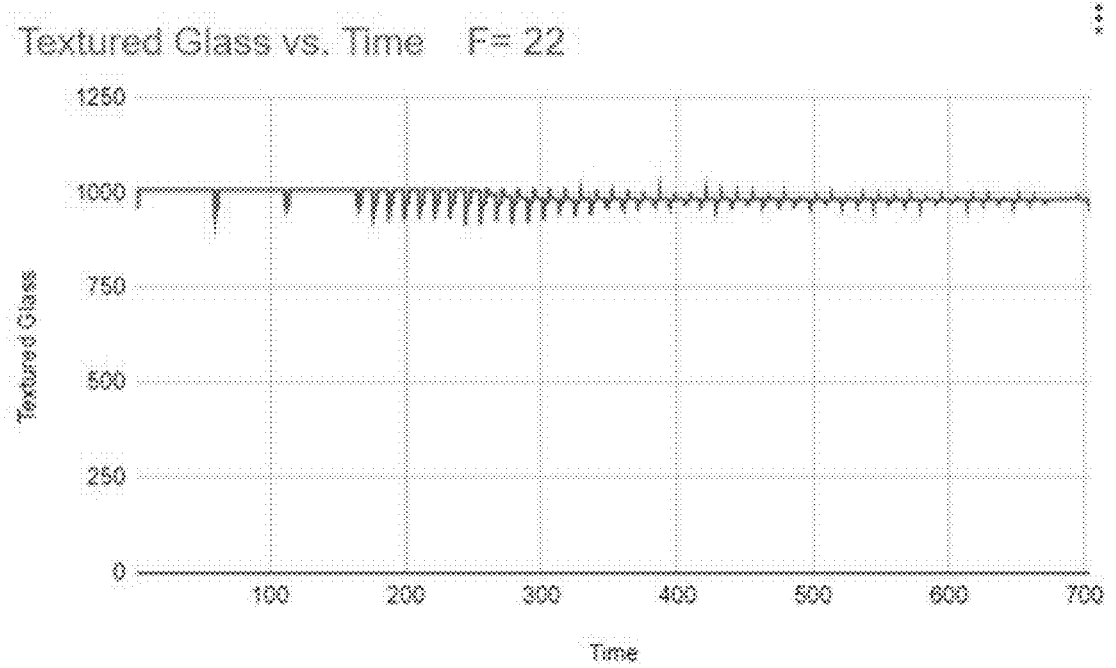

FIG. 24 depicts a chart and screen output with experimental data indicating accuracy and reduction of separation force achieved with some exemplary embodiments of the present invention. As may be gleaned from the images, a system that employs a surface coating on breathable membrane or optical clear glass or plastics as described in this disclosure, yields an increased accuracy of 98.2% within 100 um tolerances. Similarly, forces are significantly reduced (F=22 v. F=360) from those of conventional means.

In each of these embodiments mentioned above, a microstructure is created that is configured to reduce the separating forces during 3D printing. In some embodiments, a powder may also be implemented between the permeable substrate and rigid substrate. This may be achieved by sandwiching between the permeable substrate and the permeable layer, an aluminum powder layer therein.

Accordingly, in some exemplary embodiments, In some exemplary embodiments, a reservoir assembly for use in three-dimensional printing, comprising: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame.

Similarly, in some exemplary embodiments, a system for three-dimensional printing, comprising: a computer coupled to a light source including instructions for selectively illuminating a photosensitive liquid in accordance with a geometric profile of a three-dimensional (3D) object, the light source for polymerizing the photosensitive liquid and forming a polymerized section of the 3D object; and reservoir assembly adapted to receive the light source, comprising: a top frame having a cavity with an aperture defined on a bottom edge of the top frame, the cavity configured to be at least partially filled with a photosensitive liquid; a permeable film stretchily coupled to the aperture so as to hold the photosensitive liquid within the cavity of the top frame; a bottom frame including a transparent or semi-transparent rigid substrate, the bottom frame configured to register with the top frame; and a permeable substrate sandwiched between the permeable film and the rigid substrate of the bottom frame.

As mentioned above, when a cross section is polymerized, the suction force is created between the glass and the breathable membrane, and the flexible membrane. The force generated by the upward movement of the Z-axis sucks the air from underneath the flexible membrane from the open area of the breathable membrane. It creates the breathing sound that you can hear air moving and suction is broken instantly. When the Z-axis goes to the position to create the next layer, the hydraulic forces of resin makes the flexible membrane completely flat on the flat translucent surface maximizing the accuracy of every layer.

While the embodiments and alternatives of the invention have been shown and described, it will be apparent to a person skilled in the art that various other changes and modifications can be made without departing from the spirit and scope of the invention.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into other stereolithography or three-dimensional printing systems. That is, at least a part of the devices and/or processes described herein may be integrated into a stereolithography or three-dimensional printing system via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

An apparatus, system and method for three-dimensional printing has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A reservoir assembly for use with a three-dimensional (3D) printer for printing a 3D object, comprising:
   a frame defining a cavity adapted to be at least partially filled with a photosensitive liquid;
   a first layer comprising a film adapted to be configured with a lower portion of the cavity to hold the photosensitive liquid within the cavity, and adapted to align with a second layer configured below the first layer, the second layer optionally external to or integral with the reservoir assembly; and
   a third layer comprising a semi-transparent substrate adapted to enhance a surface finish of a 3D-printed object held without an adhesive between the first layer and the second layer.

2. The reservoir assembly of claim 1, wherein the semi-transparent substrate is configured so that an increased predefined texture reduces details of the image and increases the surface finish.

3. The reservoir assembly of claim 1, wherein the semi-transparent substrate is configured so that a decreased predefined texture of the one or more filters sharpens details of the image and decreases the surface finish.

4. The reservoir assembly of claim 1, wherein the semi-transparent substrate includes one or more filters that have predefined thickness adapted to control a degree of blurring effect of the projected image during the printing process.

5. The reservoir assembly of claim 1, wherein the semi-transparent substrate comprise of a textured bottom surface of the film.

6. The reservoir assembly of claim 1, wherein the semi-transparent substrate is removable.

7. The reservoir assembly of claim 1, wherein at least a portion of the film is attached directly to a portion of the frame.

8. The reservoir assembly of claim 1, wherein at least a portion of the semi-transparent substrate is attached directly to a portion of the frame.

9. The reservoir assembly of claim 1, wherein the film is a permeable film.

10. The reservoir assembly of claim 1, wherein the projected image is projected by an LCD projection lens or a DLP projection lens coupled to the frame.

\* \* \* \* \*